(12) United States Patent
Inoue

(10) Patent No.: US 11,177,524 B2
(45) Date of Patent: Nov. 16, 2021

(54) BATTERY PACK

(71) Applicant: DENSO CORPORATION, Kariya (JP)

(72) Inventor: Yoshimitsu Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 16/179,284

(22) Filed: Nov. 2, 2018

(65) Prior Publication Data

US 2019/0140225 A1 May 9, 2019

(30) Foreign Application Priority Data

Nov. 9, 2017 (JP) .............................. JP2017-216754

(51) Int. Cl.
| | | |
|---|---|---|
| *H01M 50/20* | (2021.01) | |
| *H01M 10/613* | (2014.01) | |
| *H01M 10/44* | (2006.01) | |
| *H01M 10/48* | (2006.01) | |
| *H01M 50/147* | (2021.01) | |
| *H01M 50/258* | (2021.01) | |

(52) U.S. Cl.
CPC ......... *H01M 50/20* (2021.01); *H01M 10/441* (2013.01); *H01M 10/443* (2013.01); *H01M 10/486* (2013.01); *H01M 10/613* (2015.04); *H01M 50/147* (2021.01); *H01M 50/258* (2021.01); *H01M 2220/20* (2013.01)

(58) Field of Classification Search
CPC ............. H01M 2/2016; H01M 2/0245; H01M 2/1077; H01M 10/441; H01M 50/20; H01M 50/258
See application file for complete search history.

(56) References Cited

U.S. PATENT DOCUMENTS

| | | | |
|---|---|---|---|
| 9,543,550 B2 * | 1/2017 | Angerbauer | ........ H01M 2/1077 |
| 9,941,732 B2 * | 4/2018 | Lundholm | ............ H02J 7/0013 |
| 2013/0130071 A1 * | 5/2013 | Adachi | ................ H01M 2/206 |
| | | | 429/53 |
| 2014/0370367 A1 | 12/2014 | Higuchi et al. | |

FOREIGN PATENT DOCUMENTS

JP        2014-078517 A       5/2014

* cited by examiner

*Primary Examiner* — Ula C Ruddock
*Assistant Examiner* — Thomas H. Parsons
(74) *Attorney, Agent, or Firm* — Oliff PLC

(57) ABSTRACT

A battery pack includes an assembled battery, a battery case, a first temperature sensor and a second temperature sensor. The assembled battery has three or more battery cells electrically connected in series with each other. The battery case has the assembled battery received therein so that the assembled battery is partially exposed to outside of the battery case. The first temperature sensor is provided to detect the temperature of a most-exposed one of the three or more battery cells. The most-exposed battery cell has a maximum exposed area to the outside of the battery case among all of the three or more battery cells. The second temperature sensor is provided to detect the temperature of a least-exposed one of the three or more battery cells. The least-exposed battery cell has a minimum exposed area to the outside of the battery case among all of the three or more battery cells.

9 Claims, 20 Drawing Sheets

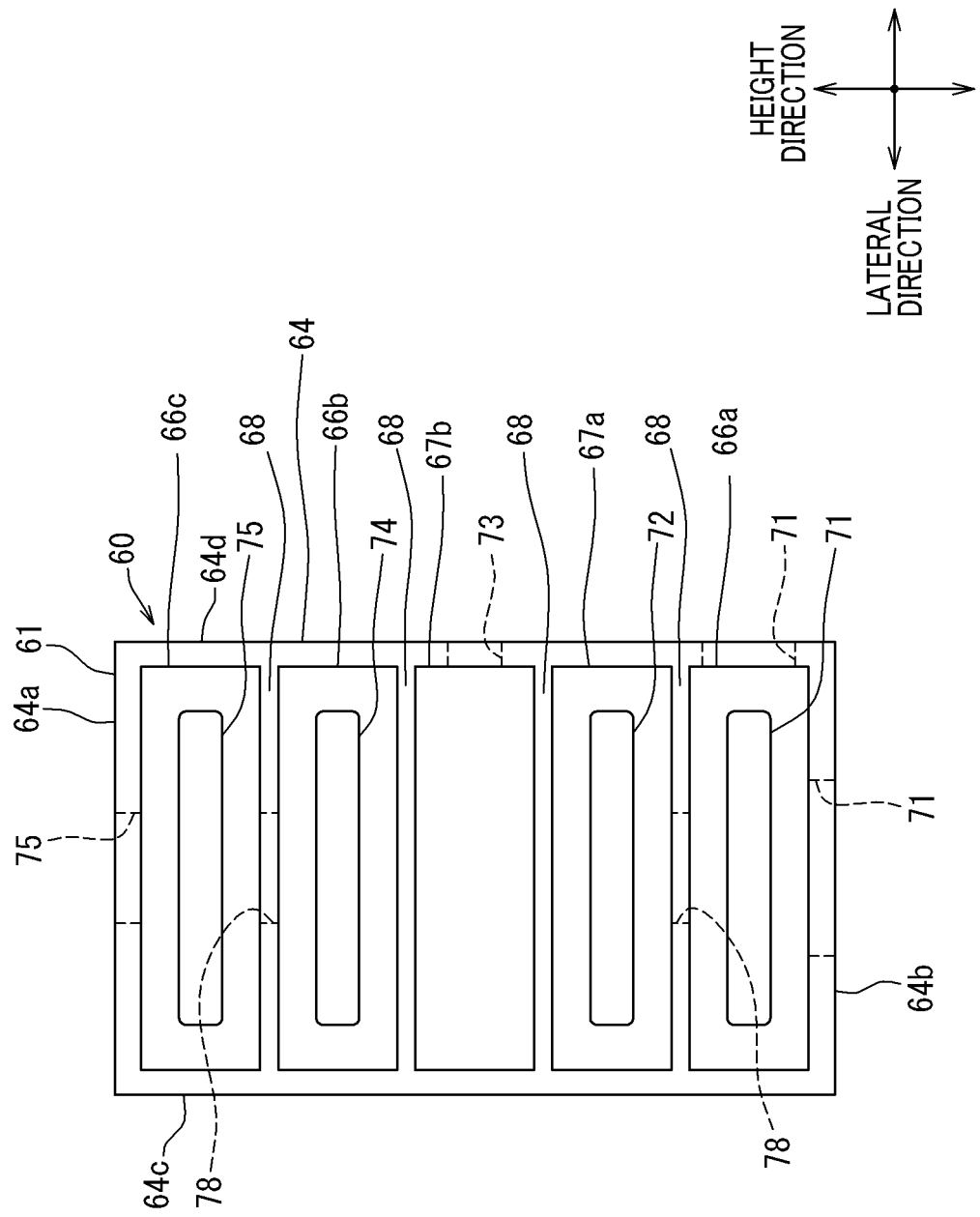

BATTERY PACK

CROSS-REFERENCE TO RELATED APPLICATION

This application is based on and claims priority from Japanese Patent Application No. 2017-216754 filed on Nov. 9, 2017, the contents of which are hereby incorporated by reference in its entirety into this application.

BACKGROUND

1 Technical Field

The present disclosure relates to battery packs that include a plurality of battery cells.

2 Description of Related Art

Japanese Patent No. JP6171606B2 discloses a battery unit (or battery pack) which includes an assembled battery module formed of a plurality of laminated battery cells and a temperature sensor configured to detect a temperature of the assembled battery module.

However, in the battery unit disclosed in the above patent document, the temperature sensor is configured to detect the temperature of the assembled battery module as a whole. That is, the above patent document fails to disclose individually detecting the temperatures of the battery cells forming the assembled battery module.

One may consider arranging a plurality of temperature sensors respectively in the battery cells forming the assembled battery module and thereby individually detecting the temperatures of the battery cells. However, in this case, the parts count and thus the manufacturing cost of the battery unit would be increased.

SUMMARY

According to the present disclosure, there is provided a battery pack which includes an assembled battery, a battery case, a first temperature sensor and a second temperature sensor. The assembled battery has three or more battery cells electrically connected in series with each other. The battery case has the assembled battery received therein so that the assembled battery is partially exposed to the outside of the battery case. The first temperature sensor is provided to detect the temperature of a most-exposed one of the three or more battery cells. The most-exposed battery cell has a maximum exposed area to the outside of the battery case among all of the three or more battery cells. The second temperature sensor is provided to detect the temperature of a least-exposed one of the three or more battery cells. The least-exposed battery cell has a minimum exposed area to the outside of the battery case among all of the three or more battery cells.

With the above configuration, among all of the three or more battery cells, the most-exposed battery cell has the highest heat dissipation performance whereas the least-exposed battery cell has the lowest heat dissipation performance. Therefore, the temperature of the most-exposed battery cell is lowest in the assembled battery whereas the temperature of the least-exposed battery cell is highest in the assembled battery. The first temperature sensor detects the temperature of the most-exposed battery cell (i.e., the lowest temperature in the assembled battery) while the second temperature sensor detects the temperature of the least-exposed battery cell (i.e., the highest temperature in the assembled battery). On the other hand, for each of the other one or more battery cells than the most-exposed and least-exposed battery cells, the temperature of the battery cell is higher than the lowest temperature in the assembled battery and lower than the highest temperature in the assembled battery. Therefore, it is possible to estimate, for each of the other one or more battery cells, the temperature of the battery cell on the basis of the temperatures of the most-exposed and least-exposed battery cells detected by the first and second temperature sensors. As a result, it is possible to determine or estimate the temperatures of all of the three or more battery cells while suppressing increase in the parts count of the battery pack.

BRIEF DESCRIPTION OF THE DRAWINGS

In the accompanying drawings:

FIG. 20 is a front view of a battery case of the battery pack according to the twelfth embodiment.

DESCRIPTION OF EMBODIMENTS

Figure 1:
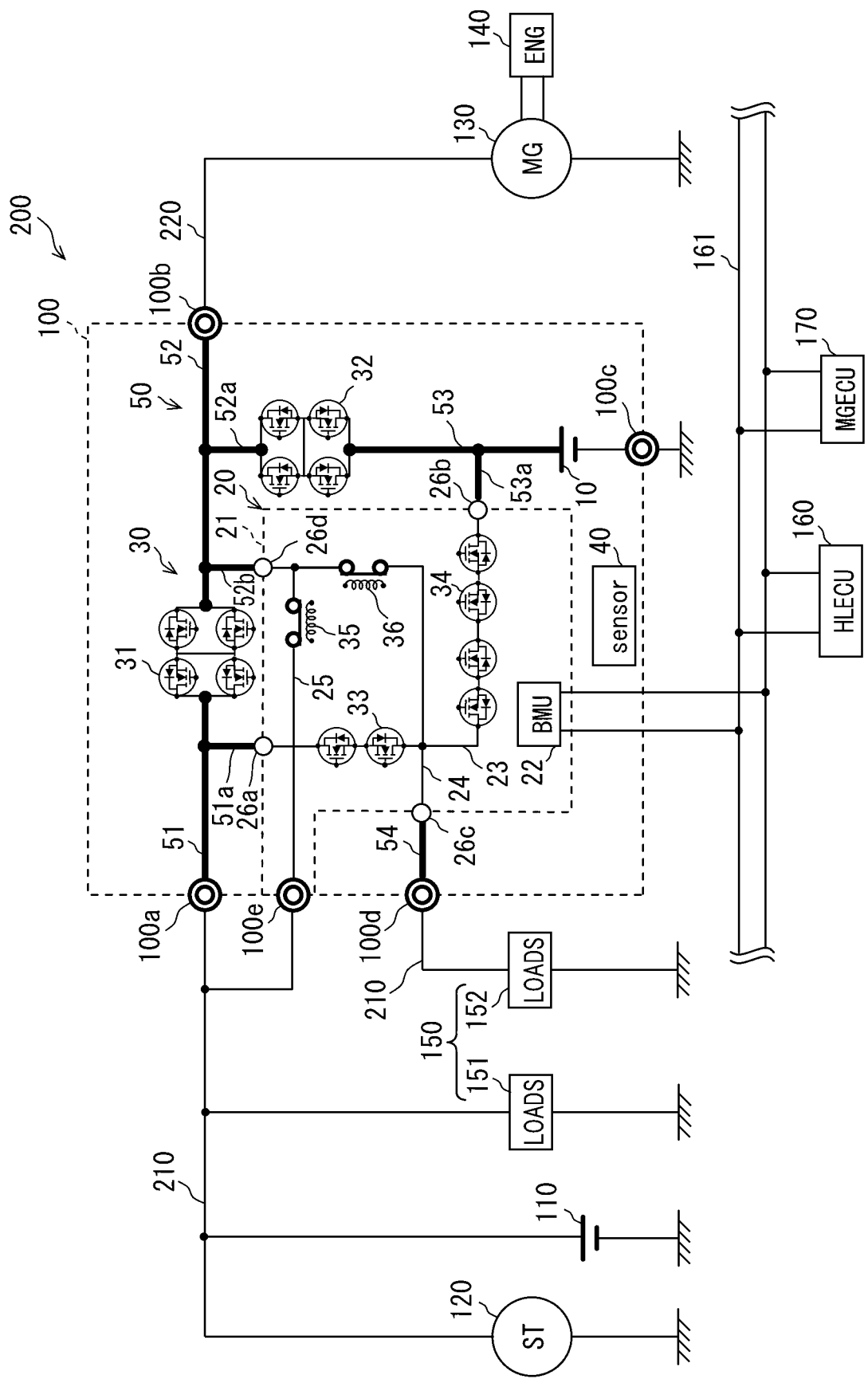
FIG. 1 is a schematic circuit diagram of a power supply system which includes a battery pack according to a first embodiment.

Exemplary embodiments will be described hereinafter with reference to FIGS. 1-20. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

A battery pack 100 according to the first embodiment and a power supply system 200 which includes the battery pack 100 will be described hereinbelow with reference to FIGS. 1-7.

Figure 2:
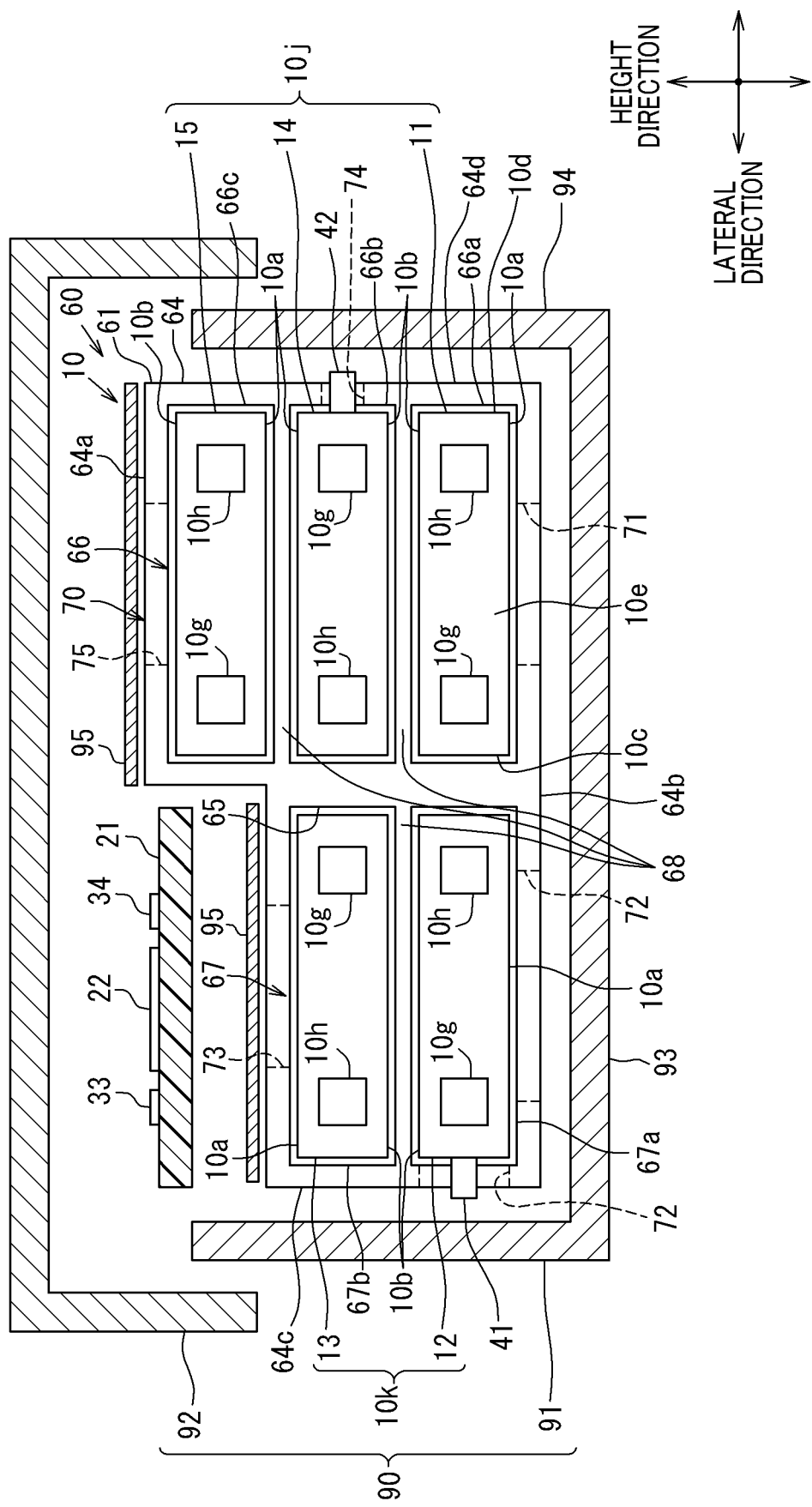
FIG. 2 is a cross-sectional view of the battery pack according to the first embodiment.

It should be noted that for the sake of simplicity, a wiring case 62 and connection busbars 80 of the battery pack 100 are not shown in FIG. 2.

(Overview of Power Supply System)

Referring first to FIG. 1, in the present embodiment, the power supply system 200 is provided in a vehicle.

The power supply system 200 includes a plurality of in-vehicle machines/devices in addition to the battery pack 100. The in-vehicle machines/devices include a lead-acid battery 110. On the other hand, the battery pack 100 includes an assembled battery 10. That is, in the present embodiment, the power supply system 200 is configured as a dual-power source system.

The in-vehicle machines/devices also include an engine 140. In the present embodiment, the vehicle has an idle stop function (or engine automatic stop/restart function) to automatically stop the engine 140 when predetermined automatic stop conditions are satisfied and then automatically restart the engine 140 when predetermined automatic restart conditions are satisfied.

As shown in FIG. 1, the in-vehicle machines/devices further include, in addition to the lead-acid battery 110 and the engine 140, a starter motor 120, a motor-generator (abbreviated to MG in FIG. 1) 130, electrical loads 150, a high-level electronic control unit (abbreviated to HLECU in FIG. 1) 160 and a motor-generator electronic control unit (abbreviated to MGECU in FIG. 1) 170. In addition, the high-level electronic control unit 160 and the motor-generator electronic control unit 170 will be respectively simply referred to as the high-level ECU 160 and the motor-generator ECU 170 hereinafter.

In the power supply system 200, the lead-acid battery 110, the starter motor 120 and the electrical loads 150 are electrically connected to the battery pack 100 via first wiring harnesses 210. On the other hand, the motor-generator 130 is electrically connected to the battery pack 100 via a second wiring harness 220. In addition, the motor-generator 130 is a rotating electric machine which selectively functions either as an electric generator or as an electric motor.

Moreover, in the power supply system 200, each of the high-level ECU 160 and the motor-generator ECU 170 is electrically connected to both the lead-acid battery 110 and the battery pack 100 via not-shown wires. Similarly, other various ECUs provided in the vehicle are also each electrically connected to both the lead-acid battery 110 and the battery pack 100 via not-shown wires.

As described above, the power supply system 200 is configured as a dual-power source system which includes two power sources, i.e., the lead-acid battery 110 and the battery pack 100 (more specifically, the assembled battery 10).

(Components of Power Supply System)

The lead-acid battery 110 generates electromotive force by chemical reactions. The lead-acid battery 110 has a higher storage capacity than the assembled battery 10 of the battery pack 100.

The starter motor 120 is configured to start the engine 140. Specifically, in starting the engine 140, the starter motor 120 is mechanically connected to the engine 140. Consequently, with rotation of the starter motor 120, a crankshaft of the engine 140 rotates. When the rotational speed of the crankshaft of the engine 140 exceeds a predetermined speed, fuel spray is injected into combustion chambers of the engine 140 by respective fuel injectors. Then, air-fuel mixture in the combustion chambers is ignited by respective ignition plugs to combust. Consequently, with the combustion of the air-fuel mixture in the combustion chambers, the engine 140 starts rotating by itself. Thus, with the rotation of the engine 140, a propulsive power of the vehicle is generated. In addition, upon start of the self-rotation of the engine 140, the mechanical connection between the starter motor 120 and the engine 140 is released (or broken).

The motor-generator 130 selectively operates either in a motor mode (or power running mode) or in a generator mode.

Specifically, the motor-generator 130 is electrically connected to an inverter (not shown). The inverter is electrically connected to the second wiring harness 220.

The inverter converts DC power supplied from at least one of the lead-acid battery 110 and the assembled battery 10 of the battery pack 100 into AC power and outputs the resultant AC power to the motor-generator 130. Then, upon being supplied with the AC power outputted from the inverter, the motor-generator 130 operates in the motor mode to generate rotational energy (or torque).

The motor-generator 130 is mechanically connected with the engine 140. More specifically, the motor-generator 130 and the engine 140 are mechanically connected with each other via, for example, a belt so that rotational energy can be transmitted between them. Therefore, the rotational energy generated by the motor-generator 130 in the motor mode is transmitted to the engine 140, thereby facilitating rotation of the engine 140 and thus assisting in the vehicle driving.

Moreover, as described previously, the vehicle has the idle stop function to automatically stop the engine 140 when predetermined automatic stop conditions are satisfied and then automatically restart the engine 140 when predetermined automatic restart conditions are satisfied. The rotational energy generated by the motor-generator 130 in the motor mode is used not only for assisting in the vehicle driving but also for rotating the crankshaft to automatically restart the engine 140 after an automatic stop of the engine 140.

On the other hand, upon being supplied with rotational energy transmitted from the engine 140 and/or wheels of the vehicle, the motor-generator 130 operates in the generator mode to generate AC power. The AC power generated by the motor-generator 130 in the generator mode is converted by the inverter into DC power and the resultant DC power is then supplied to the battery pack 100, the lead-acid battery 110 and the electrical loads 150.

The engine 140 generates the propulsive power of the vehicle through the combustion of the air-fuel mixture in the combustion chambers. As described above, in starting the engine 140, the crankshaft of the engine 140 is rotated by the starter motor 120. On the other hand, in automatically restarting the engine 140 after an automatic stop of the engine 140, the crankshaft of the engine 140 is rotated by the motor-generator 130.

The electrical loads 150 include ordinary loads 151 and protected loads 152. The ordinary loads 151 include those in-vehicle loads which do not necessarily require electric power supplied thereto to be constant, such as a sheet heater, an air blowing fan, an electric compressor, a room light and a headlight. On the other hand, the protected loads 152 include those in-vehicle loads which require electric power supplied thereto to be constant, such as an electric shift position, an electric power steering (EPS), an anti-lock braking system (ABS), a door lock, a navigation system and an audio device. Moreover, the protected loads 152 have a property such that when the voltage of the electric power supplied thereto becomes lower than a reset threshold value, they are switched from an on-state to an off-state. In addition, the protected loads 152 include those in-vehicle loads which are more relevant than the ordinary loads 151 to the vehicle driving.

In the vehicle, there are provided various ECUs which include the high-level ECU 160 and the motor-generator ECU 170. All of the ECUs are electrically connected with each other via bus lines 161, establishing an in-vehicle network. The ECUs perform coordinated control on, for example, the combustion in the engine 140 and the operation of the motor-generator 130. The high-level ECU 160 controls the battery pack 100. On the other hand, the motor-generator ECU 170 controls the motor generator 130.

Moreover, though not shown in the figures, the power supply system 200 also includes various sensors for detecting physical quantities and vehicle information. The physical quantities include, for example, various voltages and currents. The vehicle information includes, for example, the amount of depression of an accelerator pedal of the vehicle and the opening degree of a throttle valve of the vehicle. Detection signals, which are outputted from the sensors and indicative of the detection results of the sensors, are inputted to the various ECUs.

(Overview of Battery Pack)

Figure 6:
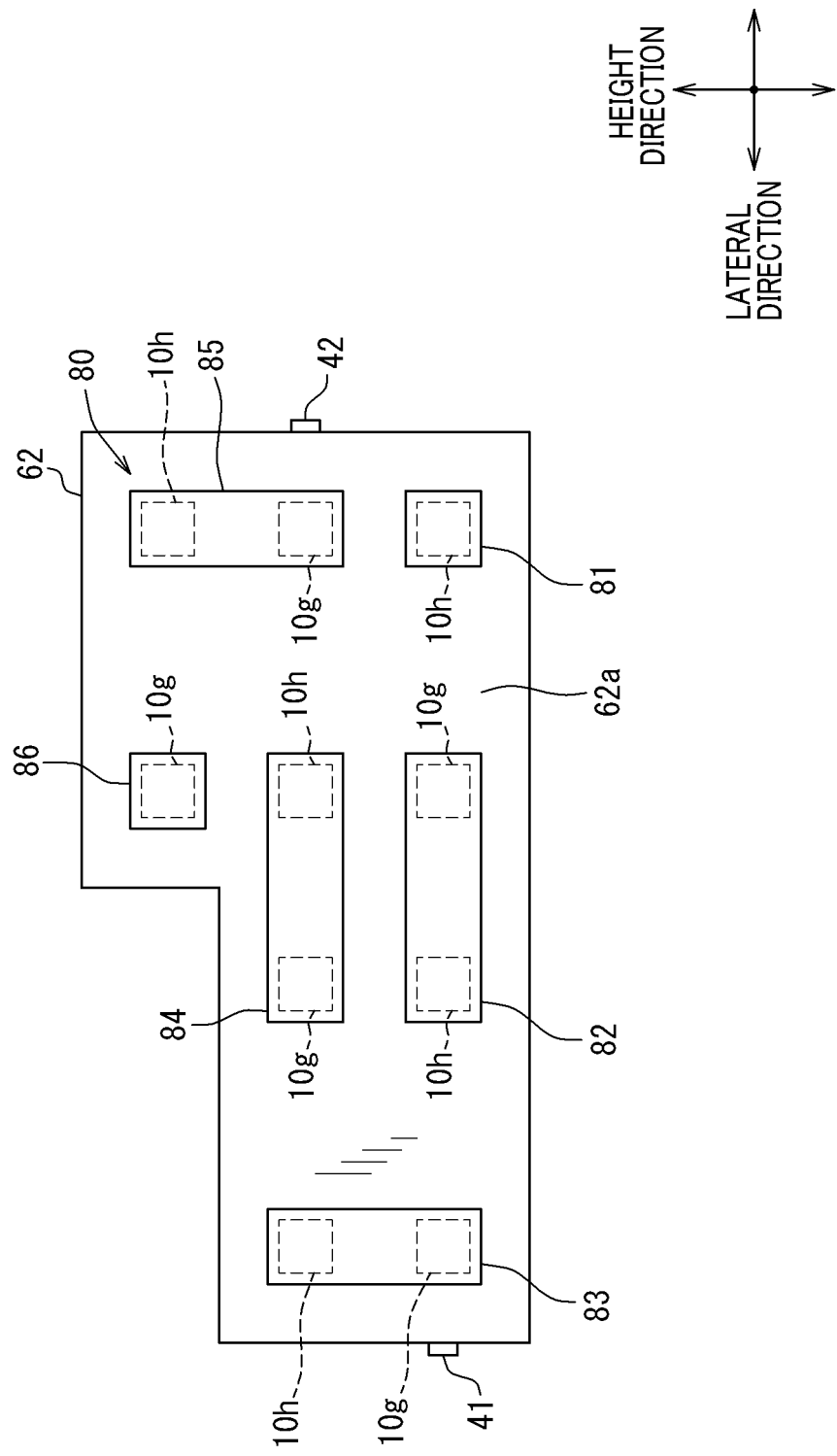
FIG. 6 is a front view illustrating connection busbars electrically connecting battery cells forming the assembled battery in the battery pack according to the first embodiment.

As shown in FIG. 1, the battery pack 100 includes the assembled battery 10, a circuit board 20, switches 30, a sensor unit 40 and power supply busbars 50. Moreover, as shown in FIGS. 2 and 6, the battery pack 100 also includes a module case 60, the connection busbars 80 and a pack case 90.

The circuit board 20 includes a wiring board 21 and a BMU (Battery Management Unit) 22. On the wiring board 21, there are mounted the BMU 22 and some of the switches 30. Moreover, the remaining switches 30 and the assembled battery 10 are electrically connected to the circuit board 20 via the power supply busbars 50. Consequently, an electric circuit is formed in the battery pack 100. In addition, the sensor unit 40 is electrically connected to the electric circuit via insulated electric wires.

Moreover, the electric circuit formed in the battery pack 100 is electrically connected with external connection terminals each of which is denoted by a double circle in FIG. 1. These external connection terminals include a first external connection terminal 100a, a second external connection terminal 100b, a third external connection terminal 100c, a fourth external connection terminal 100d and a fifth external connection terminal 100e.

The first external connection terminal 100a, the fourth external connection terminal 100d and the fifth external connection terminal 100e are electrically connected with the lead-acid battery 110, the starter motor 120 and the electrical loads 150 via the first wiring harnesses 210. The second external connection terminal 100b is electrically connected with the motor-generator 130 via the second wiring harness 220. The third external connection terminal 100c is fixed by a bolt (not shown) to the vehicle body (not shown). Moreover, the bolt, which is inserted in the third external connection terminal 100c, also functions to connect the battery pack 100 and the vehicle body. Consequently, the battery pack 100 is grounded via the vehicle body.

As shown in FIG. 1, in the power supply system 200, there are provided two first wiring harnesses 210.

One of the two first wiring harnesses 210 is provided to electrically connect the lead-acid battery 110, the starter motor 120 and the ordinary loads 151 to the first external connection terminal 100a and the fifth external connection terminal 100e. More specifically, this first wiring harness 210 is bifurcated into two end portions on the opposite side to the lead-acid battery 110, the starter motor 120 and the ordinary loads 151. One of the two end portions is electrically connected to the first external connection terminal 100a while the other end portion is electrically connected to the fifth external connection terminal 100e.

The other first wiring harness 210 is provided to electrically connect the protected loads 152 to the fourth external connection terminal 100d.

Figure 3:
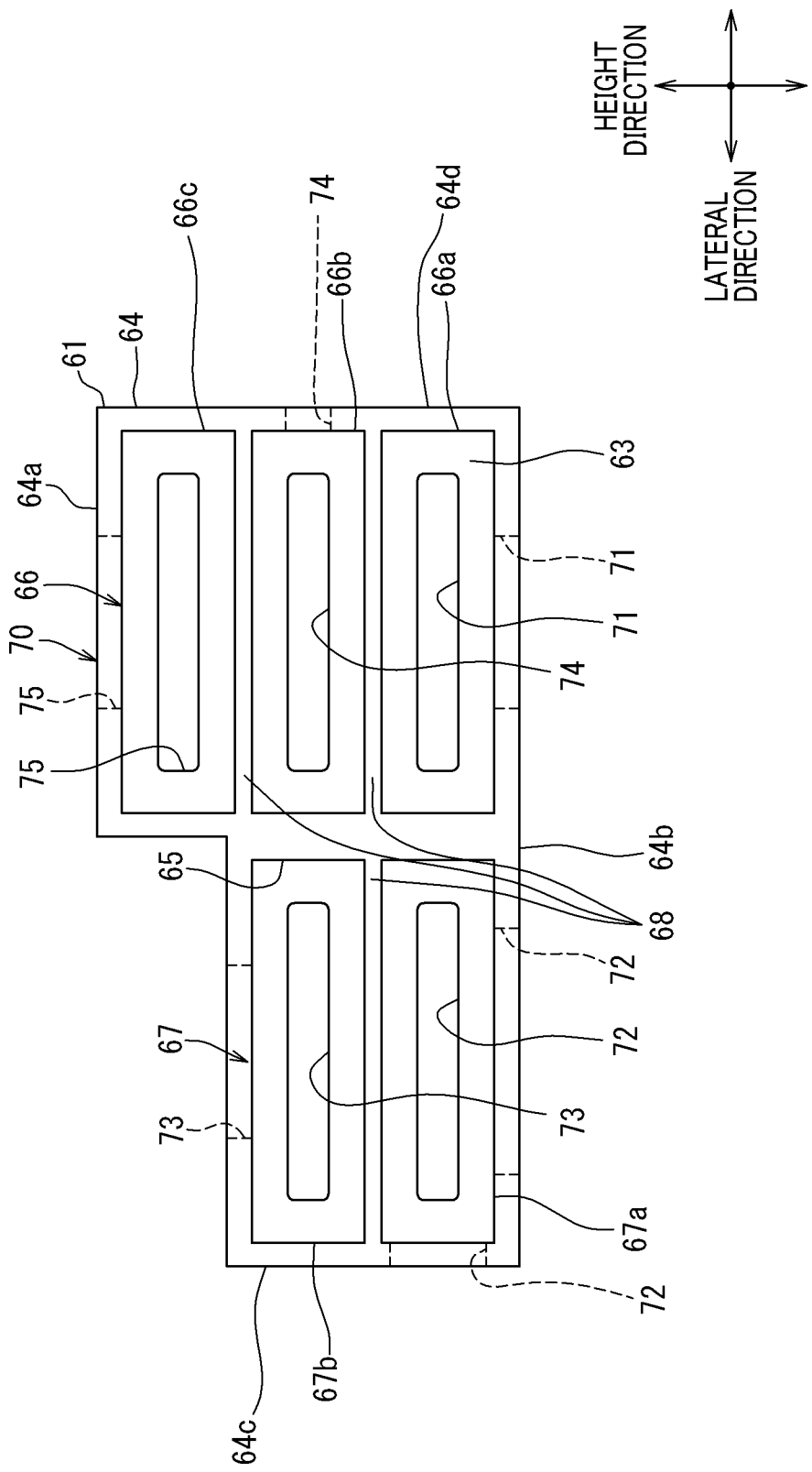
FIG. 3 is a front view of a battery case of the battery pack according to the first embodiment.
Figure 4:
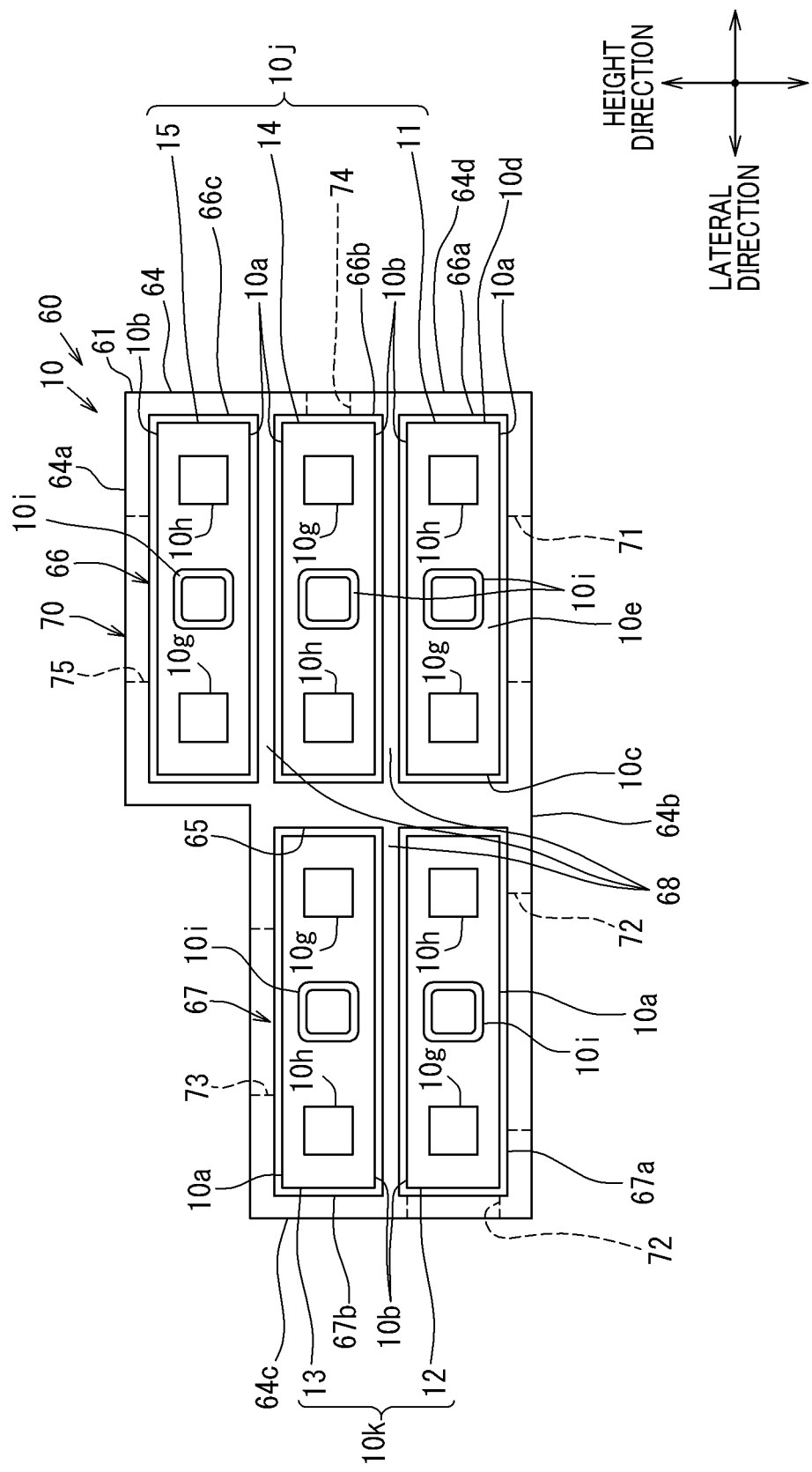
FIG. 4 is a front view illustrating an assembled battery received in the battery case in the battery pack according to the first embodiment.
Figure 5:
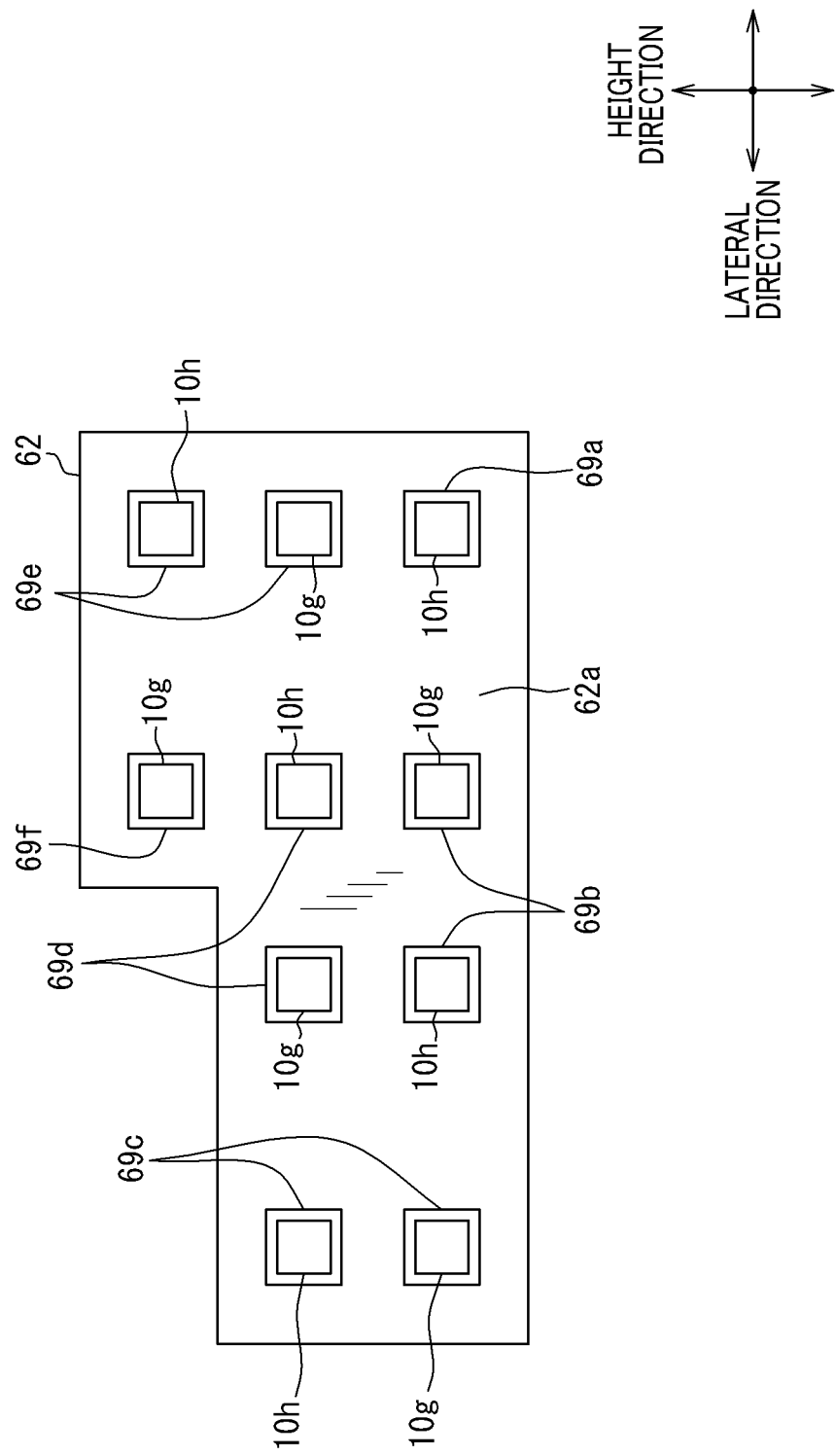
FIG. 5 is a front view illustrating a wiring case arranged to close an opening of the battery case in the battery pack according to the first embodiment.

As shown in FIGS. 3 and 5, the module case 60 is comprised of a battery case 61 and the wiring case 62. Moreover, as shown in FIG. 4, the assembled battery 10 is placed in the battery case 61. As shown in FIG. 5, the wiring case 62 is arranged to close an opening of the battery case 61, from which the assembled battery 10 is placed in the battery case 61, and mechanically connected to the battery case 61. Consequently, the assembled battery 10 is received in the module case 60 that is comprised of the battery case 61 and the wiring case 62. Furthermore, as shown in FIG. 6, electrode terminals of battery cells forming the assembled battery 10 are electrically connected in series with each other via the connection busbars 80.

As shown in FIG. 2, the pack case 90 is comprised of a case main body 91 and a cover 92, which together define a receiving space in the pack case 90. In the receiving space, there are received the assembled battery 10, the module case 60, the connection busbars 80, the circuit board 20, the switches 30, the sensor unit 40 and the power supply busbars 50.

(Components of Battery Pack)

As mentioned previously, the assembled battery 10 is formed of a plurality of battery cells. Each of the battery cells is a secondary battery. More particularly, in the present embodiment, each of the battery cells is implemented by a lithium-ion battery that generates electromotive force by chemical reactions. The generated electromotive force causes electric current to flow in the battery cells, thereby generating heat. Moreover, the generated heat causes gas to be produced in the battery cells, thereby causing the battery cells to swell.

It should be noted that the battery cells forming the assembled battery 10 may alternatively be implemented by other secondary batteries, such as nickel-metal hydride batteries or organic radical batteries.

As described above, the circuit board 20 includes the wiring board 21 and the BMU 22. The wiring board 21 is implemented by a printed wiring board that has a wiring pattern formed of an electrically conductive material on an insulating board. On the surface of the insulating board and/or inside the insulating board, there are formed a first feeder line 23, a second feeder line 24 and a third feeder line 25 as the wiring pattern. The wiring board 21 is fixed to the case main body 91 by, for example, bolts (not shown). As shown in FIG. 2, the wiring board 21 (thus the circuit board 20) is arranged between the battery case 61 (thus the module case 60) and the cover 92 of the pack case 90.

As shown in FIG. 1, on the wiring board 21, there are formed internal terminals that are electrically connected with the wiring pattern. These internal terminals include a first internal terminal 26a, a second internal terminal 26b, a third internal terminal 26c and a fourth internal terminal 26d. Moreover, on the wiring board 21, there is also formed the fifth external connection terminal 100e as a connector. The fifth external connection terminal 100e is also electrically connected with the wiring pattern. In addition, the electrical connection between the wiring pattern and the internal terminals 26a-26d and the fifth external connection terminal 100e will be described in detail later.

The switches 30 include a first switch 31, a second switch 32, a third switch 33, a fourth switch 34, a fifth switch 35 and a sixth switch 36. The first and second switches 31 and 32 are mounted to the case main body 91 while the third to the sixth switches 33-36 are mounted to the wiring board 21.

Each of the first to the fourth switches 31-34 is implemented by a semiconductor switch that includes a plurality of N-channel MOSFETs (Metal-Oxide-Semiconductor Field-Effect Transistors). Each of the first to the fourth switches 31-34 is closed upon input of a high-level control signal thereto and opened upon input of a low-level control signal thereto.

It should be noted that each of the first to the fourth switches 31-34 may alternatively be implemented by a semiconductor switch that includes a plurality of IGBTs (Insulated Gate Bipolar Transistors) each having a diode connected in parallel thereto.

On the other hand, each of the fifth and sixth switches 35 and 36 is implemented by a mechanical relay, more particularly by a normally-closed electromagnetic relay. Each of the fifth and sixth switches 35 and 36 is opened upon input of a high-level control signal thereto and closed upon input of a low-level control signal thereto. In other words, each of the fifth and sixth switches 35 and 36 is closed upon interruption of the input of the high-level control signal thereto.

In the present embodiment, each of the first to the fourth switches 31-34 includes at least one switch unit; each switch unit is formed of two N-channel MOSFETs connected in series with each other. More specifically, the source electrodes of the two MOSFETs are connected with each other while the gate electrodes of the two MOSFETs are electrically independent of each other. Moreover, each of the two MOSFETs has a parasitic diode formed therein. The anode electrodes of the parasitic diodes of the two MOSFETs are connected with each other. In addition, the gate electrodes of the two MOSFETs are electrically connected to the circuit board 20 via internal conducting members (not shown).

More particularly, in the present embodiment, as shown in FIG. 1, each of the first and second switches 31 and 32 has two switch units connected in parallel to each other; the source electrodes of the two switch units are electrically connected with each other.

The third switch 33 has only one switch unit. The fourth switch 34 has two switch units connected in series with each other.

It should be noted that for each of the first to the fourth switches 31-34, the number of the switch units provided in the switch may be suitably set according to the amount of current flowing through the switch, the redundancy and the like.

Each of the first to the fourth switches 31-34 has a resin member covering the at least one switch unit of the switch. The resin member is shaped in a rectangular cuboid. The resin member has two parallel major faces which have a maximum area among all the six faces of the resin member. The resin member has a flat shape such that the distance between the two major faces is short.

Each of the first and second switches 31 and 32 has a bolt hole formed to penetrate the two major faces of the resin member. On the other hand, in the case main body 91, there are formed mounting holes respectively corresponding to the bolt holes of the first and second switches 31 and 32. Moreover, each of the first and second switches 31 and 32 is fixed to the case main body 91 by fastening a bolt into the bolt hole of the switch and the corresponding mounting hole of the case main body 91. Consequently, each of the first and second switches 31 and 32 is both mechanically and thermally connected to the case main body 91. In addition, in each of the first and second switches 31 and 32, there is provided an insulating film between the resin member and a heat dissipating portion.

As described previously, the sensor unit 40 is electrically connected to the electric circuit formed in the battery pack 100. The sensor unit 40 includes various sensors to detect the operating states of the assembled battery 10 and the switches 30. These sensors include, for example, temperature sensors, current sensors and voltage sensors.

The sensor unit 40 detects the temperature, current and voltage of the assembled battery 10 and outputs a battery operating state signal to the BMU 22; the battery operating state signal is indicative of the detected temperature, current and voltage of the assembled battery 10. Moreover, the sensor unit 40 detects, for each of the switches 30, the temperature, current and voltage of the switch 30 and outputs a switch operating state signal to the BMU 22; the switch operating state signal is indicative of the detected temperature, current and voltage of the switch 30. In addition, as examples of the various sensors included in the sensor unit 40, there are shown a first temperature sensor 41 and a second temperature sensor 42 in FIG. 2.

The sensor unit 40 includes a submersion sensor that has a pair of opposing electrodes. When electric current flows between the opposing electrodes, the resistance between them changes upon intrusion of water into the gap between them. The sensor unit 40 outputs a submersion state signal to the BMU 22; the submersion state signal being indicative of the change in the resistance between the opposing electrodes of the submersion sensor. The BMU 22 determines, based on the submersion state signal outputted from the sensor unit 40, whether or not the change in the resistance between the opposing electrodes of the submersion sensor continues for a predetermined time; if the result of the determination is affirmative, then the BMU 22 determines that the battery pack 100 is submerged.

The BMU 22 controls the switches 30 on the basis of the battery and switch operating state signals outputted from the sensor unit 40 and/or a command signal outputted from the high-level ECU 160.

Specifically, the BMU 22 determines the SOC (state of charge) of the assembled battery 10 on the basis of the battery operating state signal outputted from the sensor unit 40. Moreover, the BMU 22 determines whether the switches 30 are operating normally or abnormally on the basis of the switch operating state signals outputted from the sensor unit 40. Then, the BMU 22 outputs a signal to the high-level ECU 160; the signal is indicative of the results of the above determinations by the BMU 22.

The high-level ECU 160 determines, based on the signal outputted from the BMU 22 and the vehicle information outputted from the various sensors, control to be performed on the switches 30. Then, the high-level ECU 160 outputs the command signal to the BMU 22; the command signal is indicative of the control determined to be performed on the switches 30.

The BMU 22 controls the switches 30 in accordance with the command signal from the high-level ECU 160. More specifically, the BMU 22 selectively outputs the high-level or low-level control signal to each of the switches 30, thereby controlling the switches 30.

In addition, upon determining that the battery pack 100 is submerged, the BMU 22 stops outputting the control signals to the switches 30. Consequently, the electrical connection of the assembled battery 10 is broken.

The power supply busbars 50 are made of an electrically conductive metal material such as copper. The power supply busbars 50 may be made by, for example, any one of the following alternative methods.

First, each of the power supply busbars 50 may be made by bending a single flat metal plate. Alternatively, each of the power supply busbars 50 may be made by joining, for example by welding, a plurality of flat metal plates. As another alternative, each of the power supply busbars 50 may be made by feeding a molten electrically-conductive metal material into a mold. In addition, each of the power supply busbars 50 may alternatively be implemented by an insulated electric wire.

As shown in FIG. 1, the power supply busbars 50 include a first power supply busbar 51, a second power supply busbar 52, a third power supply busbar 53 and a fourth power supply busbar 54. Via the power supply busbars 51-54, the circuit board 20 is electrically connected to the assembled battery 10 as well as to the external connection terminals 100a-100e. In addition, FIG. 1, the power supply busbars 51-54 are depicted to be thicker than the feeder lines 23-25 of the wiring board 21.

As described previously, the module case 60 is comprised of the battery case 61 and the wiring case 62. Each of the battery case 61 and the wiring case 62 is made of an electrically insulative resin material. Moreover, each of the battery case 61 and the wiring case 62 has a higher specific heat than air. The battery case 61 and the wiring case 62 together define a receiving space in which the assembled battery 10 is received. The configuration of the module case 60 will be described in detail later.

As described previously, the pack case 90 is comprised of the case main body 91 and the cover 92.

The case main body 91 may be made by aluminum die casting. Alternatively, the case main body 91 may be made by press working on an iron or stainless steel plate.

As shown in FIG. 2, the case main body 91 has a bottom wall 93 and a ring-shaped side wall 94 extending upward from the bottom wall 93. Consequently, in the case main body 91, there is formed an opening on the opposite side of the side wall 94 to the bottom wall 93. When the vehicle is parked on a horizontal road surface, the opening opens in the vertical direction.

The cover 92 is arranged to cover the opening of the case main body 91. Consequently, the receiving space is formed which is enclosed by the case main body 91 and the cover 92. In addition, the cover 92 is made of a resin or metal material.

Though not shown in the figures, in the bottom wall 93 of the case main body 91, there is formed a hole corresponding to the third external connection terminal 100c. Moreover, to the bottom wall 93, there is connected a flange. The flange is connected both mechanically and thermally to the vehicle body by, for example, bolts. Consequently, the battery pack 100 is fixed to the vehicle body.

In the present embodiment, the battery pack 100 is arranged under a seat in the vehicle. Alternatively, the battery pack 100 may be arranged in a space between a rear seat and a trunk in the vehicle. As another alternative, the battery pack 100 may be arranged in a space between driver's and front-passenger seats in the vehicle.

(Circuit Configuration of Battery Pack)

As shown in FIG. 1, the first external connection terminal 100a and one end of the first switch 31 are electrically connected with each other via the first power supply busbar 51. A branch busbar 51a, which branches off from the first power supply busbar 51, is electrically connected with the first internal terminal 26a of the wiring board 21.

The other end of the first switch 31 and the second external connection terminal 100b are electrically connected with each other via the second power supply busbar 52. A branch busbar 52a, which branches off from the second power supply busbar 52, is electrically connected with one end of the second switch 32.

Moreover, a branch busbar 52b, which branches off from the second power supply busbar 52 at a position between the other end of the first switch 31 and the node between the second power supply busbar 52 and the branch busbar 52a, is electrically connected with the fourth internal terminal 26d of the wiring board 21.

The other end of the second switch 32 and a positive terminal of the assembled battery 10 are electrically connected with each other via the third power supply busbar 53. A branch busbar 53a, which branches off from the third power supply busbar 53, is electrically connected with the second internal terminal 26b of the wiring board 21. In addition, a negative electrode of the assembled battery 10 is electrically connected with the third external connection terminal 100c.

The first and second internal terminals 26a and 26b of the wiring board 21 are electrically connected with each other via the first feeder line 23. In the first feeder line 23, there are serially connected the third and fourth switches 33 and 34 in this order from the first internal terminal 26a to the second internal terminal 26b.

The third and fourth internal terminals 26c and 26d of the wiring board 21 are electrically connected with each other via the second feeder line 24. Moreover, the third internal terminal 26c is electrically connected with the fourth external connection terminal 100d via the fourth power supply busbar 54.

In the second feeder line 24, there is provided the sixth switch 36. Moreover, an intermediate point between the third internal terminal 26c and the sixth switch 36 in the second feeder line 24 is connected with an intermediate point between the third and fourth switches 33 and 34 in the first feeder line 23. Consequently, the sixth switch 36 is electrically connected in parallel to the third switch 33.

An intermediate point between the fourth internal terminal 26d and the sixth switch 36 in the second feeder line 24 is electrically connected with the fifth external connection terminal 100e via the third feeder line 25. Moreover, in the third feeder line 25, there is provided the fifth switch 35. Consequently, the fifth switch 35 is electrically connected in parallel to the first switch 31.

As above, the first switch 31, the second switch 32, the fourth switch 34 and the third switch 33 are sequentially connected in a loop. An intermediate point between the first and second switches 31 and 32 is connected with the second external connection terminal 100b. An intermediate point between the second switch 32 and the fourth switch 34 is connected with the assembled battery 10. An intermediate point between the fourth switch 34 and the third switch 33 is connected with the fourth external connection terminal 100d. An intermediate point between the third switch 33 and the first switch 31 is connected with the first external connection terminal 100a.

Moreover, the intermediate point between the first and second switches 31 and 32 is connected with the intermediate point between the third and fourth switches 33 and 34 via the sixth switch 36. The intermediate point between the first and second switches 31 and 32 is also connected with the fifth external connection terminal 100e via the fifth switch 35.

With the above circuit configuration, the electrical connection between the first and second external connection terminals 100a and 100b is controlled by controlling switching of the first switch 31. In other words, the electrical connection between the lead-acid battery 110 and the motor-generator 130 is controlled by controlling switching of the first switch 31.

The electrical connection between the second external connection terminal 100b and the assembled battery 10 is controlled by controlling switching of the second switch 32. In other words, the electrical connection between the motor-generator 130 and the assembled battery 10 is controlled by controlling switching of the second switch 32.

The electrical connection between the second and third internal terminals 26b and 26c is controlled by controlling switching of the fourth switch 34. In other words, the electrical connection between the assembled battery 10 and the protected loads 152 is controlled by controlling switching of the fourth switch 34.

The electrical connection between the first internal terminal 26a and the third internal terminal 26c is controlled by controlling switching of the third switch 33. In other words, the electrical connection between the lead-acid battery 110 and the protected loads 152 is controlled by controlling switching of the third switch 33.

The electrical connection between the fourth internal terminal 26d and the third internal terminal 26c is controlled by controlling switching of the sixth switch 36. In other words, the electrical connection between the motor-generator 130 and the protected loads 152 is controlled by controlling switching of the sixth switch 36.

The electrical connection between the fourth internal terminal 26d and the fifth external connection terminal 100e is controlled by controlling switching of the fifth switch 35. In other words, the electrical connection between the motor-generator 130 and the lead-acid battery 110 is controlled by controlling switching of the fifth switch 35.

The electrical connection between the third internal terminal 26c and the fifth external connection terminal 100e is controlled by simultaneously controlling both switching of the fifth switch 35 and switching of the sixth switch 36. In other words, the electrical connection between the protected loads 15 and the lead-acid battery 110 is controlled by simultaneously controlling both switching of the fifth switch 35 and switching of the sixth switch 36.

In addition, the connection (or joining) between the power supply busbars 50 and the corresponding switches 30 is made by, for example, laser welding. The connection between the power supply busbars 50 and the corresponding external connection terminals 100a-100e is made by, for example, bolt-fastening. The connection between the power supply busbars 50 and the circuit board 20 is made by, for example, brazing.

(Configuration of Assembled Battery)

Hereinafter, for the sake of convenience of explanation, three mutually perpendicular directions of the battery pack 100 will be respectively referred to as the lateral direction, the longitudinal direction and the height direction.

In addition, the lateral direction of the battery pack 100 coincides with the lateral direction (or left-right direction) of the vehicle. The longitudinal direction of the battery pack 100 coincides with the longitudinal direction (or forward-backward direction) of the vehicle. The height direction of the battery pack 100 coincides with the height direction of the vehicle. When the vehicle is parked on a horizontal road surface, the height direction of the battery pack 100 coincides with the vertical direction; the lateral and longitudinal directions of the battery pack 100 respectively coincide with two mutually perpendicular horizontal directions.

As described previously, the assembled battery 10 is formed of a plurality of battery cells. Each of the battery cells is shaped in a rectangular cuboid. Therefore, each of the battery cells has six faces.

Specifically, as shown in FIG. 2, each of the battery cells has a first major face 10a and a second major face 10b that respectively face opposite sides in the height direction. Moreover, each of the battery cells also has a first side face 10c and a second side face 10d that respectively face opposite sides in the lateral direction. Furthermore, each of the battery cells also has a first end face 10e and a second end face 10f (not shown) that respectively face opposite sides in the longitudinal direction (i.e., the direction perpendicular to the paper surface of FIG. 2). Among the six faces 10a-10f, each of the first and second major faces 10a and 10b has a larger area than each of the remaining faces 10c-10f. In addition, each of the battery cells has a flat shape such that the distance between the first and second major faces 10a and 10b in the height direction is shorter than both the distance between the first and second side faces 10c and 10d in the lateral direction and the distance between the first and second end faces 10e and 10f in the longitudinal direction.

In each of the battery cells, on the first end face 10e, there are formed two electrode terminals, i.e., a positive terminal 10g and a negative terminal 10h. Each of the positive and negative terminals 10g and 10h is shaped in a rectangular cuboid and protrudes from the first end face 10e outward in the longitudinal direction.

The positive and negative terminals 10g and 10h are aligned with and spaced from each other in the lateral direction. The positive terminal 10g is located on the first side face 10c side while the negative terminal 10h is located on the second side face 10d side.

Moreover, as shown in FIG. 4, on the first end face 10e, there is arranged a packing 10i between the positive and negative terminals 10g and 10h. The packing 10i is made of an elastic material such as rubber. The packing 10*i* is ring-shaped to open in the longitudinal direction (i.e., the direction perpendicular to the paper surface of FIG. 4). The packing 10*i* has a larger length in the longitudinal direction than each of the positive and negative terminals 10*g* and 10*h*. When the battery case 61 and the wiring case 62 are assembled to each other, the packing 10*i* is sandwiched (or fixedly held) between the first end face 10*e* of the battery cell and the wiring case 62.

In the present embodiment, the assembled battery 10 is formed of five battery cells, i.e., a first battery cell 11, a second battery cell 12, a third battery cell 13, a fourth battery cell 14 and a fifth battery cell 15. These battery cells are arranged to form at least one battery stack (or at least one battery-cell array).

More particularly, in the present embodiment, the first battery cell 11, the fourth battery cell 14 and the fifth battery cell 15 are arranged (or aligned with each other) in the height direction to form a first battery stack 10*j*. On the other hand, the second battery cell 12 and the third battery cell 13 are arranged in the height direction to form a second battery stack 10*k*.

Specifically, as shown in FIG. 2, in the first battery stack 10*j*, the first battery cell 11, the fourth battery cell 14 and the fifth battery cell 15 are arranged in this order in the height direction from the bottom wall 93 of the case main body 91 to the cover 92 of the pack case 90. On the other hand, in the second battery stack 10*k*, the second battery cell 12 and the third battery cell 13 are arranged in this order in the height direction from the bottom wall 93 of the case main body 91 to the cover 92.

In addition, both the first and second battery stacks 10*j* and 10*k* (i.e., all of the battery cells 11-15) are received in the battery case 61.

(Configuration of Module Case)

As described previously, the module case 60 is comprised of the battery case 61 and the wiring case 62.

As shown in FIGS. 3 and 4, the battery case 61 is shaped in a box that opens in the longitudinal direction. The battery case 61 has a bottom wall 63 that faces in the longitudinal direction and a ring-shaped circumferential wall 64 that extends from the bottom wall 63 in the longitudinal direction. The circumferential wall 64 includes an upper wall 64*a* and a lower wall 64*b* that are aligned with each other in the height direction and a left wall 64*c* and a right wall 64*d* that are aligned with each other in the lateral direction. The upper wall 64*a*, the right wall 64*d*, the lower wall 64*b* and the left wall 64*c* are connected in this order in the circumferential direction around the longitudinal direction, forming a ring shape.

Moreover, the battery case 61 also has a first partition wall 65 that extends in the height direction to partition the internal space of the battery case 61 surrounded by the circumferential wall 64 into two parts in the lateral direction. One of the two parts constitutes a first battery stack-receiving space 66 while the other part constitutes a second battery stack-receiving space 67. The first and second battery stacks 10*j* and 10*k* are respectively received in the first and second battery stack-receiving spaces 66 and 67 (see FIG. 4).

Furthermore, the battery case 61 also has three second partition walls 68 that partition the first and second battery stack-receiving spaces 66 and 67 further into five equal battery cell-receiving spaces.

Specifically, in the first battery stack-receiving space 66, there are formed two second partition walls 68. Each of the two second partition walls 68 extends in the lateral direction to connect the first partition wall 65 and the right wall 64*d*.

Moreover, the two second partition walls 68 are spaced from each other in the height direction so as to partition the first battery stack-receiving space 66 into three equal parts in the height direction. The three equal parts respectively constitute a first battery cell-receiving space 66*a*, a fourth battery cell-receiving space 66*b* and a fifth battery cell-receiving space 66*c* that are arranged in this order in the height direction from the lower wall 64*b* to the upper wall 64*a*. The first battery cell 11, the fourth battery cell 14 and the fifth battery cell 15 are respectively received in the first battery cell-receiving space 66*a*, the fourth battery cell-receiving space 66*b* and the fifth battery cell-receiving space 66*c* (see FIG. 4).

On the other hand, in the second battery stack-receiving space 67, there is formed only one second partition wall 68. The second partition wall 68 extends in the lateral direction to connect the first partition wall 65 and the left wall 64*c*. Moreover, the second partition wall 68 is located in the height direction so as to partition the second battery stack-receiving space 67 into two equal parts in the height direction. The two equal parts respectively constitute a second battery cell-receiving space 67*a* and a third battery cell-receiving space 67*b* that are arranged in this order in the height direction from the lower wall 64*b* to the upper wall 64*a*. The second battery cell 12 and the third battery cell 13 are respectively received in the second battery cell-receiving space 67*a* and the third battery cell-receiving space 67*b* (see FIG. 4).

The first battery cell-receiving space 66*a* and the second battery cell-receiving space 67*a* are aligned with each other in the lateral direction. The fourth battery cell-receiving space 66*b* and the third battery cell-receiving space 67*b* are aligned with each other in the lateral direction. On the other hand, at the corner between the fifth battery cell-receiving space 66*c* and the third battery cell-receiving space 67*b*, there is formed a vacant space the size (or volume) of which is equal to that of each of the battery cell-receiving spaces 66*a*-66*c* and 67*a*-67*b*. As shown in FIG. 2, at least part of the circuit board 20 is arranged in the vacant space. Consequently, the at least part of the circuit board 20 is aligned with the fifth battery cell-receiving space 66*c* in the lateral direction.

Each of the battery cell-receiving spaces 66*a*-66*c* and 67*a*-67*b* has an opening that opens in the longitudinal direction. The battery cells 11-15 are respectively inserted in the battery cell-receiving spaces 66*a*-66*c* and 67*a*-67*b* through the openings thereof until the second end faces 10*f* (not shown) of the battery cells 11-15 are brought into contact with the bottom wall 63 of the battery case 61. Consequently, the battery cells 11-15 are respectively received in the battery cell-receiving spaces 66*a*-66*c* and 67*a*-67*b* with the first end faces 10*e* of the battery cells 11-15 and thus the positive and negative terminals 10*g* and 10*h* formed on the first end faces 10*e* protruding outside the receptive battery cell-receiving spaces 66*a*-66*c* and 67*a*-67*b* from the openings thereof. Moreover, for each of the battery cells 11-15, first end face 10*e*-side end portions of the major faces 10*a*-10*b* and side faces 10*c*-10*d* of the battery cell also protrude outside the respective battery cell-receiving space from the opening thereof. That is to say, each of the battery cells 11-15 is received in the battery case 61 with part of the battery cell exposed from the opening of the battery case 61 to the outside of the battery case 61.

In the first battery stack-receiving space 66, the second major face 10*b* of the first battery cell 11 and the second major face 10*b* of the fourth battery cell 14 face each other in the height direction. Moreover, the first major face 10*a* of the fourth battery cell 14 and the first major face 10a of the fifth battery cell 15 face each other in the height direction. Consequently, the positive terminal 10g of the fourth battery cell 14 is interposed between and aligned with the negative terminals 10h of the first battery cell 11 and fifth battery cell 15 in the height direction while the negative terminal 10h of the fourth battery cell 14 is interposed between and aligned with the positive terminals 10g of the first battery cell 11 and fifth battery cell 15 in the height direction.

In the second battery stack-receiving space 67, the second major face 10b of the second battery cell 12 and the second major face 10b of the third battery cell 13 face each other in the height direction. Consequently, the negative terminal 10h of the second battery cell 12 and the positive terminal 10g of the third battery cell 13 are adjacent to and aligned with each other in the height direction while the positive terminal 10g of the second battery cell 12 and the negative terminal 10h of the third battery cell 13 are adjacent to and aligned with each other in the height direction.

The positive terminal 10g of the first battery cell 11 and the negative terminal 10h of the second battery cell 12 are adjacent to and aligned with each other in lateral direction. The negative terminal 10h of the fourth battery cell 14 and the positive terminal 10g of the third battery cell 13 are adjacent to and aligned with each other in lateral direction.

As shown in FIG. 5, the wiring case 62 is shaped to be longer in the lateral direction than in the height direction. Moreover, a central part of the wiring case 62 is recessed in the longitudinal direction away from the battery case 61. The wiring case 62 is mechanically connected (or assembled) to the battery case 61 so as to close the openings of the battery cell-receiving spaces 66a-66c and 67a-67b of the battery case 61 while covering the protruding parts of the battery cells 11-15 from the openings of the battery cell-receiving spaces 66a-66c and 67a-67b. Moreover, after the assembly of the wiring case 62 to the battery case 61, the wiring case 62 is located within the projected plane of the battery case 61 in the longitudinal direction.

Though not shown in the figures, each of the battery case 61 and the wiring case 62 has a plurality of screw holes each of which is formed along the longitudinal direction. In assembling the wiring case 62 to the battery case 61, the wiring case 62 is first arranged to close the opening of the battery case 61 so that each of the screw holes of the wiring case 62 is aligned with a corresponding one of the screw holes of the battery case 61 in the longitudinal direction. Then, for each aligned-pair of the screw holes of the battery case 61 and the wiring case 62, a screw is fastened into the aligned-pair of the screw holes. Consequently, the battery case 61 and the wiring case 62 are mechanically connected in such as manner as to become close to each other in the longitudinal direction. In addition, for each aligned-pair of the screw holes of the battery case 61 and the wiring case 62, screw grooves may be formed in at least one of the screw holes of the aligned pair.

Moreover, with the fastening of the screws, the packings 10i arranged on the first end faces 10e of the battery cells 11-15 are compressed between the battery cells 11-15 and the wiring case 62 in the longitudinal direction. Consequently, a restoring force is created in each of the packings 10i in the longitudinal direction. The restoring force presses the battery cells 11-15 against the bottom wall 63 of the battery case 61, thereby keeping the battery cells 11-15 sandwiched between the packings 10i and the bottom wall 63 of the battery case 61 in the longitudinal direction. As a result, displacement of the battery cells 11-15 in the longitudinal direction is suppressed. In addition, swelling of the battery cells 11-15 in the longitudinal direction is also suppressed.

As described previously, each of the battery cells 11-15 has the first and second major faces 10a and 10b facing in the height direction. The area of each of the first and second major faces 10a and 10b is larger than the area of each of the first and second side faces 10c and 10d as well as than the area of the first and second end faces 10e and 10f. Therefore, it is easier for each of the battery cells 11-15 to swell in the height direction than in the lateral direction or the longitudinal direction.

In view of the above, in the present embodiment, as shown in FIG. 2, suppression plates 95 are provided between the upper wall 64a of the battery case 61 and the cover 92 of the pack case 90 to suppress swelling of the battery cells 11-15 in the height direction. The suppression plates 95 are fixed, for example by bolts, to the bottom wall 93 of the case main body 91 of the pack case 90. The module case 60, which is comprised of the battery case 61 and the wiring case 62, is located between the suppression plates 95 and the bottom wall 93 of the case main body 91 in the height direction. Consequently, swelling of the assembled battery 10 formed of the battery cells 11-15 and thus swelling of the module case 60 having the assembled battery 10 received therein are suppressed in the height direction by the suppression plates 95 and the bottom wall 93 of the case main body 91.

Moreover, as will be described in detail later, there are formed heat dissipation apertures 70 in the upper wall 64a of the battery case 61. On the other hand, in the suppression plates 95, there are formed through-holes penetrating the respective suppression plates 95 in the height direction and respectively corresponding to the heat dissipation apertures 70 formed in the upper wall 64a of the battery case 61. Consequently, the heat dissipation apertures 70 formed in the upper wall 64a of the battery case 61 communicate with the internal space of the pack case 90 via the corresponding through-holes of the suppression plates 95.

As shown in FIG. 5, in the wiring case 62, there are formed a plurality of openings for electrically connecting the battery cells 11-15 with the connection busbars 80. Each of the openings penetrates the wiring case 62 in the longitudinal direction (i.e., the direction perpendicular to the paper surface of FIG. 5). That is, each of the openings penetrates the wiring case 62 to connect an outer surface 62a and an inner surface of the wiring case 62; the outer surface 62a faces outside of the module case 60 in the longitudinal direction while the inner surface faces inside of the module case 60 in the longitudinal direction.

More particularly, in the present embodiment, as the openings of the wiring case 62, there are formed a first opening 69a, two second openings 69b, two third openings 69c, two fourth openings 69d, two fifth openings 69e and a sixth opening 69f. The first opening 69a is formed corresponding to the negative terminal 10h of the first battery cell 11 which is connected to a negative output terminal of the assembled battery 10 to be described later. In contrast, the sixth opening 69f is formed corresponding to the positive terminal 10g of the fifth battery cell 15 which is connected a positive output terminal of the assembled battery 10 to be described later. The second openings 69b, the third openings 69c, the fourth openings 69d and the fifth openings 69e are formed respectively corresponding to the remainder of the positive and negative terminals 10g and 10h of the battery cells 11-15.

Specifically, after assembly of the wiring case 62 to the battery case 61, the first opening 69a of the wiring case 62 is opposed to (or aligned with) the negative terminal 10h of the first battery cell 11 in the longitudinal direction. The second openings 69b of the wiring case 62 are respectively opposed to the positive terminal 10g of the first battery cell 11 and the negative terminal 10h of the second battery cell 12 in the longitudinal direction. The third openings 69c of the wiring case 62 are respectively opposed to the positive terminal 10g of the second battery cell 12 and the negative terminal 10h of the third battery cell 13 in the longitudinal direction. The fourth openings 69d of the wiring case 62 are respectively opposed to the positive terminal 10g of the third battery cell 13 and the negative terminal 10h of the fourth battery cell 14 in the longitudinal direction. The fifth openings 69e of the wiring case 62 are respectively opposed to the positive terminal 10g of the fourth battery cell 14 and the negative terminal 10h of the fifth battery cell 15 in the longitudinal direction. The sixth opening 69f of the wiring case 62 is opposed to the positive terminal 10g of the fifth battery cell 15 in the longitudinal direction.

(Connection Busbars)

The connection busbars 80 may be made in the same manner as the above-described power supply busbars 50.

The connection busbars 80 include a first connection busbar 81, a second connection busbar 82, a third connection busbar 83, a fourth connection busbar 84, a fifth connection busbar 85 and a sixth connection busbar 86. As shown in FIG. 6, the first to the sixth connection busbars 81-86 are provided on the outer surface 62a of the wiring case 62. Moreover, parts of the first to the sixth connection busbars 81-86 are respectively provided in the first to the sixth openings 69a-69e of the wiring case 62.

Specifically, the first connection busbar 81 is provided on the outer surface 62a of the wiring case 62 so as to close the first opening 69a of the wiring case 62. Moreover, the first connection busbar 81 has one end portion inserted in the first opening 69a of the wiring case 62. Further, the end portion of the first connection busbar 81 is both mechanically and electrically connected to the negative terminal 10h of the first battery cell 11 by, for example, laser welding.

In addition, the other end portion of the first connection busbar 81 is grounded. More specifically, though not shown in the figures, at the other end portion of the first connection busbar 81, there is formed a negative connection terminal. This negative connection terminal serves as the negative output terminal of the assembled battery 10.

The second connection busbar 82 is provided on the outer surface 62a of the wiring case 62 so as to close both the second openings 69b of the wiring case 62. Moreover, the second connection busbar 82 extends in the lateral direction to have opposite end portions thereof respectively inserted in the two second openings 69b of the wiring case 62. Further, the opposite end portions of the second connection busbar 82 are both mechanically and electrically connected respectively to the positive terminal 10g of the first battery cell 11 and the negative terminal 10h of the second battery cell 12 by, for example, laser welding. Consequently, the first battery cell 11 and the second battery cell 12 are connected in series with each other via the second connection busbar 82.

The third connection busbar 83 is provided on the outer surface 62a of the wiring case 62 so as to close both the third openings 69c of the wiring case 62. Moreover, the third connection busbar 83 extends in the height direction to have opposite end portions thereof respectively inserted in the two third openings 69c of the wiring case 62. Further, the opposite end portions of the third connection busbar 83 are both mechanically and electrically connected respectively to the positive terminal 10g of the second battery cell 12 and the negative terminal 10h of the third battery cell 13 by, for example, laser welding. Consequently, the second battery cell 12 and the third battery cell 13 are connected in series with each other via the third connection busbar 83.

The fourth connection busbar 84 is provided on the outer surface 62a of the wiring case 62 so as to close both the fourth openings 69d of the wiring case 62. Moreover, the fourth connection busbar 84 extends in the lateral direction to have opposite end portions thereof respectively inserted in the two fourth openings 69d of the wiring case 62. Further, the opposite end portions of the fourth connection busbar 84 are both mechanically and electrically connected respectively to the positive terminal 10g of the third battery cell 13 and the negative terminal 10h of the fourth battery cell 14 by, for example, laser welding. Consequently, the third battery cell 13 and the fourth battery cell 14 are connected in series with each other via the fourth connection busbar 84.

The fifth connection busbar 85 is provided on the outer surface 62a of the wiring case 62 so as to close both the fifth openings 69e of the wiring case 62. Moreover, the fifth connection busbar 85 extends in the height direction to have opposite end portions thereof respectively inserted in the two fifth openings 69e of the wiring case 62. Further, the opposite end portions of the fifth connection busbar 85 are both mechanically and electrically connected respectively to the positive terminal 10g of the fourth battery cell 14 and the negative terminal 10h of the fifth battery cell 15 by, for example, laser welding. Consequently, the fourth battery cell 14 and the fifth battery cell 15 are connected in series with each other via the fifth connection busbar 85.

The sixth connection busbar 86 is provided on the outer surface 62a of the wiring case 62 so as to close the sixth opening 69f of the wiring case 62. Moreover, the sixth connection busbar 86 has one end portion inserted in the sixth opening 69f of the wiring case 62. Further, the end portion of the sixth connection busbar 86 is both mechanically and electrically connected to the positive terminal 10g of the fifth battery cell 15 by, for example, laser welding.

In addition, though not shown in the figures, at the other end portion of the sixth connection busbar 86, there is formed a positive connection terminal. This positive connection terminal serves as the positive output terminal of the assembled battery 10.

(Heat Dissipation Performances of Battery Cells)

As shown in FIG. 3, in the battery case 61, there are formed the heat dissipation apertures 70 for dissipating heat generated in the battery cells 11-15 during charge/discharge of the assembled battery 10. Moreover, as shown in FIG. 4, each of the battery cells 11-15 has at least one part thereof exposed to the outside of the battery case 61 via a corresponding one of the heat dissipation apertures 70.

In addition, as described previously, for each of the battery cells 11-15, the protruding part of the battery cell, which includes the first end face 10e of the battery cell and protrudes outside of the battery case 61 from the opening of the battery case 61, is also exposed to the outside of the battery case 61. Accordingly, for each of the battery cells 11-15, the total exposed area of the battery cell (i.e., the total area of the battery cell exposed to the outside of the battery case 61) is equal to the sum of the area of the protruding part of the battery cell and the area of the at least one part of the battery cell exposed to the outside of the battery case 61 via the corresponding heat dissipation aperture 70.

The heat dissipation apertures 70 are formed in some of those walls of the battery case 61 which define the battery cell-receiving spaces 66a-66c and 67a-67b of the battery case 61. Specifically, those walls of the battery case 61 which define the battery cell-receiving spaces 66a-66c and 67a-67b include the bottom wall 63, the circumferential wall 64, the first partition wall 65 and the second partition walls 68. Moreover, among those walls of the battery case 61 which define the battery cell-receiving spaces 66a-66c and 67a-67b, the heat dissipation apertures 70 are formed only in the bottom wall 63 and the circumferential wall 64 which correspond to external walls of the battery case 61.

As shown in FIG. 3, in the present embodiment, the heat dissipation apertures 70 include two first heat dissipation apertures 71, three second heat dissipation apertures 72, two third heat dissipation apertures 73, two fourth heat dissipation apertures 74 and two fifth heat dissipation apertures 75.

One of the two first heat dissipation apertures 71 is formed in that part of the bottom wall 63 which defines the first battery cell-receiving space 66a while the other first heat dissipation aperture 71 is formed in that part of the circumferential wall 64 which defines the first battery cell-receiving space 66a.

One of the three second heat dissipation apertures 72 is formed in that part of the bottom wall 63 which defines the second battery cell-receiving space 67a while the remaining two second heat dissipation apertures 72 are formed in that part of the circumferential wall 64 which defines the second battery cell-receiving space 67a.

One of the two third heat dissipation apertures 73 is formed in that part of the bottom wall 63 which defines the third battery cell-receiving space 67b while the other third heat dissipation aperture 73 is formed in that part of the circumferential wall 64 which defines the third battery cell-receiving space 67b.

One of the two fourth heat dissipation apertures 74 is formed in that part of the bottom wall 63 which defines the fourth battery cell-receiving space 66b while the other fourth heat dissipation aperture 74 is formed in that part of the circumferential wall 64 which defines the fourth battery cell-receiving space 66b.

One of the two fifth heat dissipation apertures 75 is formed in that part of the bottom wall 63 which defines the fifth battery cell-receiving space 66c while the other fifth heat dissipation aperture 75 is formed in that part of the circumferential wall 64 which defines the fifth battery cell-receiving space 66c.

Moreover, as shown in FIG. 3, in the present embodiment, all of those first, second, third, fourth and fifth heat dissipation apertures 71-75 which are formed in the bottom wall 63 are identical. Therefore, all of the open areas of the heat dissipation apertures 71-75 formed in the bottom wall 63 are equal to each other. Accordingly, all of the exposed areas of those parts of the battery cells 11-15 which are exposed to the outside of the battery case 61 respectively via the heat dissipation apertures 71-75 formed in the bottom wall 63 are equal to each other.

On the other hand, there is variation in the open areas of those first, second, third, fourth and fifth heat dissipation apertures 71-75 which are formed in the circumferential wall 64. Accordingly, there is also variation in the exposed areas of those parts of the battery cells 11-15 which are exposed to the outside of the battery case 61 respectively via the heat dissipation apertures 71-75 formed in the circumferential wall 64.

It should be noted that in FIGS. 2-4, the heat dissipation apertures 71-75 formed in the circumferential wall 64 are shown with dashed lines for the purpose of indicating that these heat dissipation apertures 71-75 are located closer than an end face of the circumferential wall 64 defining the opening of the battery case 61 to the bottom wall 63 in the longitudinal direction.

As shown in FIG. 4, in the circumferential wall 64 of the battery case 61, the first heat dissipation aperture 71 is formed in the lower wall 64b. Consequently, part of the first major face 10a of the first battery cell 11 is exposed to the outside of the battery case 61 via the first heat dissipation aperture 71.

In the circumferential wall 64 of the battery case 61, the two second heat dissipation apertures 72 are respectively formed in the lower wall 64b and the left wall 64c. Consequently, part of the first major face 10a of the second battery cell 12 and part of the first side face 10c of the second battery cell 12 are exposed to the outside of the battery case 61 respectively via the two second heat dissipation apertures 72.

In addition, as will be described in detail later, the first temperature sensor 41 is arranged in the second heat dissipation aperture 72 formed in the left wall 64c. Therefore, strictly speaking, part of the first side face 10c of the second battery cell 12 is exposed to the outside of the battery case 61 via that part of the second heat dissipation aperture 72 formed in the left wall 64c which is not occupied by the first temperature sensor 41 (see FIG. 2).

Referring again to FIG. 4, in the circumferential wall 64 of the battery case 61, the third heat dissipation aperture 73 is formed in the upper wall 64a. Consequently, part of the first major face 10a of the third battery cell 13 is exposed to the outside of the battery case 61 via the third heat dissipation aperture 73.

In addition, in the present embodiment, the second heat dissipation aperture 72 formed in the lower wall 64b and the third heat dissipation aperture 73 formed in the upper wall 64a are at least partially aligned with each other in the height direction. However, it should be noted that the second heat dissipation aperture 72 formed in the lower wall 64b and the third heat dissipation aperture 73 formed in the upper wall 64a may alternatively be out of alignment with each other in the height direction.

In the circumferential wall 64 of the battery case 61, the fourth heat dissipation aperture 74 is formed in the right wall 64d. Consequently, part of the first side face 10c of the fourth battery cell 14 is exposed to the outside of the battery case 61 via the fourth heat dissipation aperture 74.

In addition, as will be described in detail later, the second temperature sensor 42 is arranged in the fourth heat dissipation aperture 74 formed in the right wall 64d. Consequently, most of the internal space defined by the fourth heat dissipation aperture 74 is occupied by the second temperature sensor 42. Therefore, the area of that part of the first side face 10c of the fourth battery cell 14 which is exposed to the outside of the battery case 61 via the fourth heat dissipation aperture 74 is slight (see FIG. 2).

Referring again to FIG. 4, in the circumferential wall 64 of the battery case 61, the fifth heat dissipation aperture 75 is formed in the upper wall 64a. Consequently, part of the second major face 10b of the fifth battery cell 15 is exposed to the outside of the battery case 61 via the fifth heat dissipation aperture 75.

In addition, in the present embodiment, the first heat dissipation aperture 71 formed in the lower wall 64b and the fifth heat dissipation aperture 75 formed in the upper wall 64a are at least partially aligned with each other in the height direction. However, it should be noted that the first heat dissipation aperture 71 formed in the lower wall 64b and the fifth heat dissipation aperture 75 formed in the upper wall 64a may alternatively be out of alignment with each other in the height direction.

As can be seen from FIG. 3, in the present embodiment, the open area of the first heat dissipation aperture 71 formed in the lower wall 64b, the open area of the third heat dissipation aperture 73 formed in the upper wall 64a and the open area of the fifth heat dissipation aperture 75 formed in the upper wall 64a are equal to each other. On the other hand, the open area of the second heat dissipation aperture 72 formed in the lower wall 64b is larger than each of the open areas of the aforementioned heat dissipation apertures 71, 73 and 75. In contrast, the open area of the fourth heat dissipation aperture 74 formed in the right wall 64d is considerably smaller than each of the open areas of the aforementioned heat dissipation apertures 71, 73 and 75. Moreover, the open area of the second heat dissipation aperture 72 formed in the left wall 64c is larger than the open area of the fourth heat dissipation aperture 74 formed in the right wall 64d. That is, among all of the heat dissipation apertures 71-75, the second heat dissipation aperture 72 formed in the lower wall 64b has the maximum open area whereas the fourth heat dissipation aperture 74 has the minimum open area.

To sum up, in the present embodiment, the open areas of the first heat dissipation aperture 71, the third heat dissipation aperture 73 and the fifth heat dissipation aperture 75 are equal to each other. The sum of the open areas of the two second heat dissipation apertures 72 is considerably larger than each of the open areas of the first heat dissipation aperture 71, the third heat dissipation aperture 73 and the fifth heat dissipation aperture 75. The open area of the fourth heat dissipation aperture 74 is considerably smaller than each of the open areas of the first heat dissipation aperture 71, the third heat dissipation aperture 73 and the fifth heat dissipation aperture 75.

Moreover, as described previously, in the present embodiment, all of the open areas of the heat dissipation apertures 71-75 formed in the bottom wall 63 are equal to each other. Therefore, the total open area of all the first heat dissipation apertures 71 formed in the bottom and circumferential walls 63 and 64, the total open area of all the third heat dissipation apertures 73 formed in the bottom and circumferential walls 63 and 64 and the total open area of all the fifth heat dissipation apertures 75 formed in the bottom and circumferential walls 63 and 64 are equal to each other. The total open area of all the second heat dissipation apertures 72 formed in the bottom and circumferential walls 63 and 64 is considerably larger than each of the total open area of all the first heat dissipation apertures 71, the total open area of all the third heat dissipation apertures 73 and the total open area of all the fifth heat dissipation apertures 75. The total open area of all the fourth heat dissipation apertures 74 formed in the bottom and circumferential walls 63 and 64 is considerably smaller than each of the total open area of all the first heat dissipation apertures 71, the total open area of all the third heat dissipation apertures 73 and the total open area of all the fifth heat dissipation apertures 75.

Accordingly, in the present embodiment, the exposed area of the first battery cell 11 via all the first heat dissipation apertures 71, the exposed area of the third battery cell 13 via all the third heat dissipation apertures 73 and the exposed area of the fifth battery cell 15 via all the fifth heat dissipation apertures 75 are equal to each other. On the other hand, the exposed area of the second battery cell 12 via all the second heat dissipation apertures 72 is considerably larger than each of the aforementioned exposed areas of the first battery cell 11, the third battery cell 13 and the fifth battery cell 15. In contrast, the exposed area of the fourth battery cell 14 via all the fourth heat dissipation apertures 74 is considerably smaller than each of the aforementioned exposed areas of the first battery cell 11, the third battery cell 13 and the fifth battery cell 15.

Consequently, among the first to the fifth battery cells 11-15, the second battery cell 12 has highest heat dissipation performance whereas the fourth battery cell 14 has lowest heat dissipation performance.

Moreover, in the present embodiment, the first battery cell 11, the fourth battery cell 14 and the fifth battery cell 15 are arranged in the height direction to form the first battery stack 10j. On the other hand, the second battery cell 12 and the third battery cell 13 are arranged in the height direction to form the second battery stack 10k. That is, the number of the battery cells included in the first battery stack 10j is larger than the number of the battery cells included in the second battery stack 10k. Therefore, the amount of heat generated in the first battery stack 10j is larger than the amount of heat generated in the second battery stack 10k.

Consequently, it is easier for the temperatures of the battery cells included in the first battery stack 10j to increase than for the temperatures of the battery cells included in the second battery stack 10k to increase. The fourth battery cell 14 is included in the first battery stack 10j while the second battery cell 12 is included in the second battery stack 10k. Therefore, it is easier for the temperature of the fourth battery cell 14 to increase than for the temperature of the second battery cell 12 to increase.

Moreover, in the present embodiment, the fourth battery cell 14 is arranged at the center of the first battery stack 10j (or first battery-cell array) in the height direction (or arrangement direction). That is, the fourth battery cell 14 is arranged inside (or away from both ends of) the first battery stack 10j in the height direction. Therefore, it is difficult for the heat generated in the fourth battery cell 14 to be dissipated; thus it is easy for the temperature of the fourth battery cell 14 to increase.

In contrast, the second battery cell 12 is arranged at one end of the second battery stack 10k (or second battery-cell array) in the height direction (or arrangement direction). Therefore, it is easy for the heat generated in the second battery cell 12 to be dissipated; thus it is difficult for the temperature of the second battery cell 12 to increase.

In the present embodiment, the second battery cell 12 is aligned with the first battery cell 11 in the lateral direction while the fourth battery cell 14 is aligned with the third battery cell 13 in the lateral direction. That is, the second battery cell 12 is out of alignment with the fourth battery cell 14 in the lateral direction. Therefore, it is difficult for heat to be transmitted from the fourth battery cell 14 to the second battery cell 12.

In the present embodiment, as shown in FIG. 2, the second battery cell 12 is located closer than the fourth battery cell 14 to the bottom wall 93 of the case main body 91 of the pack case 90. In other words, the fourth battery cell 14 is located closer than the second battery cell 12 to the opening of the case main body 91 (or to the cover 92 of the pack case 90).

In the pack case 90, it is easy for temperature to increase in the height direction from the bottom wall 93 of the case main body 91 to the cover 92. Therefore, it is easier for the temperature of the fourth battery cell 14 to increase than for the temperature of the second battery cell 12 to increase. In other words, it is more difficult for the temperature of the second battery cell 12 to increase than for the temperature of the fourth battery cell 14 to increase.

With the above configuration of the battery pack 90 according to the present embodiment, among the first to the fifth battery cells 11-15, it is easiest for the heat generated in the second battery cell 12 to be dissipated; thus it is most difficult for the temperature of the second battery cell 12 to increase. In contrast, it is most difficult for the heat generated in the fourth battery cell 14 to be dissipated; thus it is easiest for the temperature of the fourth battery cell 14 to increase.

Accordingly, it is possible to detect the lowest temperature in the assembled battery 10 by detecting the temperature of the second battery cell 12. Moreover, it is also possible to detect the highest temperature in the assembled battery 10 by detecting the temperature of the fourth battery cell 14.

Figure 7:
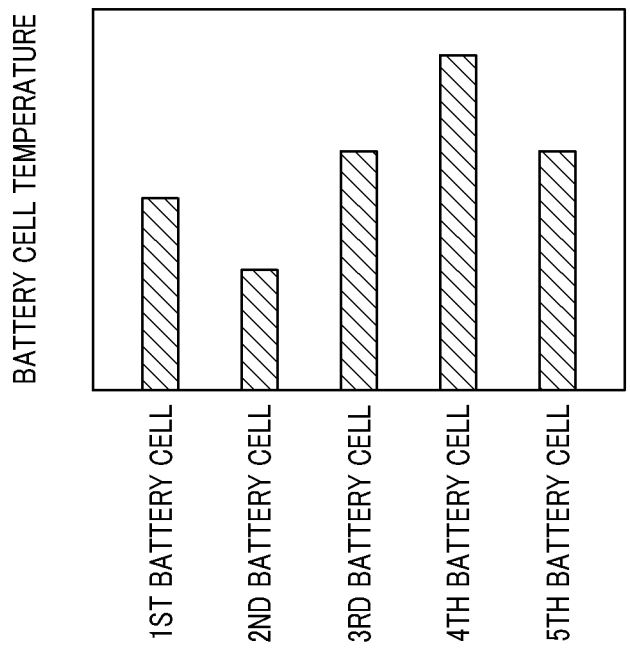
FIG. 7 is a graphical representation giving a comparison between the temperatures of the battery cells that together form the assembled battery in the battery pack according to the first embodiment.

FIG. 7 gives a comparison between the temperatures of the battery cells 11-15 after charge/discharge of the assembled battery 10.

As can be seen from FIG. 7, in the assembled battery 10, the temperatures of the battery cells 11-15 increase in the order of the second battery cell 12, the first battery cell 11, the third battery cell 13, the fifth battery cell 15 and the fourth battery cell 14.

(Temperature Sensors)

As shown in FIG. 2, in the present embodiment, the first temperature sensor 41 is arranged to detect the temperature of the second battery cell 12.

More specifically, the first temperature sensor 41 is arranged on the first side face 10c of the second battery cell 12 to have a temperature detecting portion (e.g., thermistor) thereof in contact with the first side face 10c. As described previously, part of the first side face 10c of the second battery cell 12 is exposed to the outside of the battery case 61 via the second heat dissipation aperture 72 formed in the left wall 64c of the battery case 61. In addition, though not shown in the figures, a holding member, which holds the temperature detecting portion of the first temperature sensor 41, is fixed to the left wall 64c of the battery case 61. The temperature detecting portion of the first temperature sensor 41 is pressed by the holding member on the first side face 10c of the second battery cell 12. With the above arrangement, it is possible for the first temperature sensor 41 to detect the temperature of the second battery cell 12 (i.e., the lowest temperature in the assembled battery 10).

On the other hand, the second temperature sensor 42 is arranged to detect the temperature of the fourth battery cell 14.

More specifically, the second temperature sensor 42 is arranged on the first side face 10c of the fourth battery cell 14 to have a temperature detecting portion thereof in contact with the first side face 10c. As described previously, part of the first side face 10c of the fourth battery cell 14 is exposed to the outside of the battery case 61 via the fourth heat dissipation aperture 74 formed in the right wall 64d of the battery case 61. In addition, though not shown in the figures, a holding member, which holds the temperature detecting portion of the second temperature sensor 42, is fixed to the right wall 64d of the battery case 61. The temperature detecting portion of the second temperature sensor 42 is pressed by the holding member on the first side face 10c of the fourth battery cell 14. With the above arrangement, it is possible for the second temperature sensor 42 to detect the temperature of the fourth battery cell 14 (i.e., the highest temperature in the assembled battery 10).

In addition, the first and second temperature sensors 41 and 42 may be fixed to the battery case 61 by any suitable method, such as bonding, crimping or screw-fastening.

Alternatively, the temperature detecting portions of the first and second temperature sensors 41 and 42 may be fixed respectively to the second and fourth battery cells 12 and 14 by, for example, bonding.

The temperature detecting portions of the first and second temperature sensors 41 and 42 are electrically connected with the BMU 22 via not-shown insulated wiring. Consequently, output signals of the first and second temperature sensors 41 and 42, which respectively indicate the temperatures of the second and fourth battery cells 12 and 14 detected by the sensors 41 and 42, are inputted to the BMU 22.

The BMU 22 determines the temperatures of the second and fourth battery cells 12 and 14 on the basis of the output signals of the first and second temperature sensors 41 and 42.

Moreover, the temperatures of the battery cells 11, 13 and 15 are higher than the temperature of the second battery cell 12 and lower than the temperature of the fourth battery cell 14. Therefore, the BMU 22 estimates the temperatures of the battery cells 11, 13 and 15 on the basis of the determined temperatures of the second and fourth battery cells 12 and 14.

For each of the battery cells 11-15, the temperature of the battery cell has a correlation with the internal resistance, deterioration state and SOC of the battery cell. Therefore, the BMU 22 also estimates, for each of the battery cells 11-15, the internal resistance, deterioration state and SOC of the battery cell on the basis of the determined or estimated temperature of the battery cell and output signals of other sensors (e.g., a current sensor and a voltage sensor).

In general, the lower the temperature of a battery cell, the higher the internal resistance of the battery cell. Therefore, when the temperature of the second battery cell 12 (i.e., the lowest temperature in the assembled battery 10) detected by the first temperature sensor 41 is extremely low, the internal resistance of the second battery cell 12 is extremely high. In the assembled battery 10, the first to the fifth battery cells 11-15 are electrically connected in series with each other. Accordingly, when the internal resistance of the second battery cell 12 is extremely high, the electric power outputted from the assembled battery 10 by discharge is extremely low. Consequently, it becomes impossible for the assembled battery 10 to supply a required amount of electric power to the in-vehicle loads such as the motor-generator 130.

In view of the above, in the present embodiment, the BMU 22 determines, during discharge of the assembled battery 10, whether the temperature of the second battery cell 12 detected by the first temperature sensor 41 is lower than a low-temperature threshold. Here, the low-temperature threshold is predetermined based on the results of an experiment or computer simulation and stored in a not-shown memory thereof.

When it is determined that the temperature of the second battery cell 12 detected by the first temperature sensor 41 is lower than the low-temperature threshold, the BMU 22 restricts discharge of the assembled battery 10. More specifically, in this case, the BMU 22 keeps both the second switch 32 and the fourth switch 34 in an open state.

Moreover, when it is determined that the temperature of the second battery cell 12 detected by the first temperature sensor 41 becomes higher than or equal to the low-temperature threshold, the BMU 22 removes (or cancels) the restriction on discharge of the assembled battery 10. More specifically, in this case, the BMU 22 closes both the second switch 32 and the fourth switch 34.

Furthermore, when the motor-generator 130 operates in the generator mode and it is necessary to charge the assembled battery 10, the BMU 22 keeps the second switch 32 in a closed state regardless of the temperature of the second battery cell 12 detected by the first temperature sensor 41.

In addition, the BMU 22 corresponds to a controller that controls charge/discharge of the assembled battery 10.

In automatically restarting the engine 140 by the motor-generator 130 after an automatic stop of the engine 140, the BMU 22 makes the determination as to whether the temperature of the second battery cell 12 detected by the first temperature sensor 41 is lower than the low-temperature threshold. Then, based on the result of the determination, the BMU 22 further determines whether or not to allow the assembled battery 10 to supply electric power to the motor-generator 130.

On the other hand, in starting the engine 140 by the starter motor 120, the BMU 22 inhibits the assembled battery 10 from supplying electric power to the starter motor 120 since there is a probability that the temperature of the second battery cell 12 is lower than the low-temperature threshold.

As described previously, the temperature of a battery cell has a correlation with deterioration of the battery cell. More specifically, when the temperature of a battery cell is high, deterioration of the battery cell may rapidly progress. Therefore, when the temperature of the fourth battery cell 14 (i.e., the highest temperature in the assembled battery 10) detected by the second temperature sensor 42 is extremely high, deterioration of the fourth battery cell 14 may rapidly progress. In the assembled battery 10, the first to the fifth battery cells 11-15 are electrically connected in series with each other. Accordingly, when deterioration of the fourth battery cell 14 rapidly progresses, the service life of the assembled battery 10 may be rapidly shortened.

In view of the above, in the present embodiment, the BMU 22 determines, during charge/discharge of the assembled battery 10, whether the temperature of the fourth battery cell 14 detected by the second temperature sensor 42 is higher than a high-temperature threshold. Here, the high-temperature threshold is predetermined based on the results of an experiment or computer simulation and stored in the not-shown memory thereof. In addition, the high-temperature threshold is higher than the aforementioned low-temperature threshold.

When it is determined that the temperature of the fourth battery cell 14 detected by the second temperature sensor 42 is higher than the high-temperature threshold, the BMU 22 restricts charge/discharge of the assembled battery 10. More specifically, in this case, the BMU 22 keeps both the second switch 32 and the fourth switch 34 in the open state.

Moreover, when it is determined that the temperature of the fourth battery cell 14 detected by the second temperature sensor 42 becomes lower than or equal to the high-temperature threshold, the BMU 22 removes the restriction on charge/discharge of the assembled battery 10. More specifically, in this case, the BMU 22 closes both the second switch 32 and the fourth switch 34.

(Operational Effects)

As described above, in the present embodiment, the exposed area of the second battery cell 12 is larger than each of the exposed areas of the other battery cells 11 and 13-15. The second battery cell 12 is included in the second battery stack 10k; the number of the battery cells included in the second battery stack 10k is smaller than the number of the battery cells included in the first battery stack 10j. The second battery cell 12 is arranged at one end of the second battery stack 10k (or second battery-cell array) in the height direction (or arrangement direction). The second battery cell 12 is out of alignment with the fourth battery cell 14 in the lateral direction. The second battery cell 12 is located in the pack case 90 on the bottom wall 93 side where it is difficult for temperature to increase.

With the above configuration, it is easier for the heat generated in the second battery cell 12 to be dissipated than for the heat generated in the other battery cells 11 and 13-15 to be dissipated. Therefore, it is more difficult for the temperature of the second battery cell 12 to increase than for the temperatures of the other battery cells 11 and 13-15 to increase. The first temperature sensor 41 is arranged to detect the temperature of the second battery cell 12. Consequently, it is possible to detect the lowest temperature in the assembled battery 10 by the first temperature sensor 41.

In contrast, the exposed area of the fourth battery cell 14 is smaller than each of the exposed areas of the other battery cells 11-13 and 15. The fourth battery cell 14 is included in the first battery stack 10j; the number of the battery cells included in the first battery stack 10j is larger than the number of the battery cells included in the second battery stack 10k. The fourth battery cell 14 is arranged inside (or away from both ends of) the first battery stack 10j in the height direction. The fourth battery cell 14 is located in the pack case 90 on the cover 92 side where it is easy for temperature to increase.

With the above configuration, it is more difficult for the heat generated in the fourth battery cell 14 to be dissipated than for the heat generated in the other battery cells 11-13 and 15 to be dissipated. Therefore, it is easier for the temperature of the fourth battery cell 14 to increase than for the temperatures of the other battery cells 11-13 and 15 to increase. The second temperature sensor 42 is arranged to detect the temperature of the fourth battery cell 14. Consequently, it is possible to detect the highest temperature in the assembled battery 10 by the second temperature sensor 42.

Moreover, the temperatures of the battery cells 11, 13 and 15 are higher than the temperature of the second battery cell 12 and lower than the temperature of the fourth battery cell 14. Therefore, it is possible for the BMU 22 to estimate the temperatures of the battery cells 11, 13 and 15 on the basis of the temperatures of the second and fourth battery cells 12 and 14 detected by the first and second temperature sensors 41 and 42.

As above, according to the present embodiment, it is possible to determine or estimate all of the temperatures of the first to the fifth battery cells 11-15 with only two temperature sensors 41 and 42. That is, it is possible to detect the temperatures of three or more battery cells while suppressing increase in the parts count of the battery pack 100.

In the present embodiment, when the temperature of the second battery cell 12 (i.e., the lowest temperature in the assembled battery 10) detected by the first temperature sensor 41 is lower than the low-temperature threshold, the BMU 22 restricts discharge of the assembled battery 10. Consequently, it is possible to avoid a situation where the in-vehicle loads such as the motor-generator 130 are supplied with electric power from the assembled battery 10 but the assembled battery 10 is unable to supply a required amount of electric power to the in-vehicle loads.

In the present embodiment, when the temperature of the fourth battery cell 14 (i.e., the highest temperature in the assembled battery 10) detected by the second temperature sensor 42 is higher than the high-temperature threshold, the BMU 22 restricts charge/discharge of the assembled battery 10. Consequently, it is possible to prevent deterioration of the fourth battery cell 14 from rapidly progressing. As a result, it is possible to prevent the service life of the assembled battery 10, in which the first to the fifth battery cells 11-15 are electrically connected in series with each other, from being rapidly shortened.

Second Embodiment

As described previously, in the first embodiment, in the battery case 61, there are formed the heat dissipation apertures 70 via which the battery cells 11-15 are partially exposed to the outside of the battery case 61 (see FIG. 4).

Figure 8:
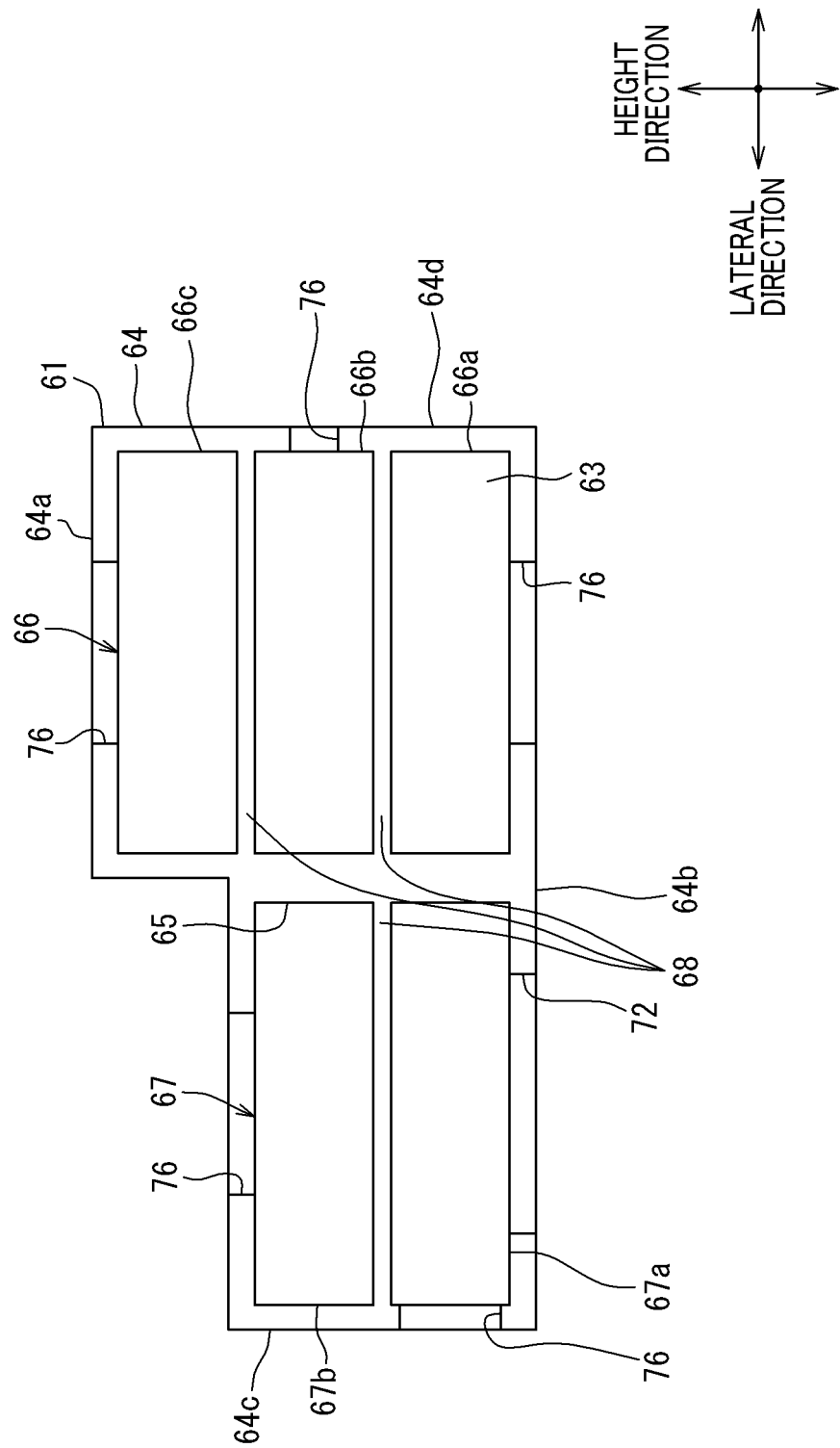
FIG. 8 is a front view of a battery case of a battery pack according to a second embodiment.

In comparison, in the present embodiment, as shown in FIG. 8, there are no heat dissipation apertures 70 formed in the battery case 61. Instead, there are formed recesses 76 in the end face of the circumferential wall 64 defining the opening of the battery case 61.

Specifically, as described in the first embodiment, the battery case 61 has the opening from which the assembled battery 10 is placed in the battery case 61. Moreover, each of the battery cells 11-15 is received in the battery case 61 with part of the battery cell protruding outside the battery case 61 from the opening. The circumferential wall 64 has the end face which is formed at the open end of the battery case 61 to define (or enclose) the opening of the battery case 61. In the present embodiment, each of the recesses 76 is formed in the end face of the circumferential wall 64 of the battery case 61 so as to be recessed from the end face of the circumferential wall 64 in the longitudinal direction (i.e., the direction perpendicular to the paper surface of FIG. 8) toward the bottom wall 63 of the battery case 61. Consequently, each of the battery cells 11-15 is partially exposed to the outside of the battery case 61 via at least one of the recesses 61.

More specifically, in the present embodiment, though not shown in the figures, the wiring case 62 also covers the protruding parts of the battery cells 11-15 which protrude from the opening of the battery case 61 in the longitudinal direction. Each of the first battery cell 11, the third battery cell 13, the fourth battery cell 14 and the fifth battery cell 15 is partially exposed to the outside of the battery case 61 via one corresponding recess 76. On the other hand, the second battery cell 12 is partially exposed to the outside of the battery case 61 via two corresponding recesses 76.

It should be noted that in FIG. 8, the recesses 76 are shown with continuous lines since they are formed in the end face of the circumferential wall 64 of the battery case 61 and thus visible from the point of view of FIG. 8.

Moreover, in the present embodiment, the exposed area of the second battery cell 12 to the outside of the battery case 61 via the two corresponding recesses 76 is larger than each of the exposed areas of the other battery cells 11 and 13-15 to the outside of the battery case 61 via the corresponding recesses 76. On the other hand, the exposed area of the fourth battery cell 14 to the outside of the battery case 61 via the corresponding recess 76 is smaller than each of the exposed areas of the other battery cells 11-13 and 15 via the corresponding recesses 6.

According to the present embodiment, it is also possible to achieve the same operational effects as described in the first embodiment.

In addition, though not shown in the figures, the configuration of the battery case 61 according to the first embodiment and the configuration of the battery case 61 according to the present embodiment may be combined so that the resultant battery case 61 has both the heat dissipation apertures 70 as described in the first embodiment and the recesses 76 as described in the present embodiment.

Third Embodiment

As described previously, in the first embodiment, the heat dissipation apertures 70 are formed in both the bottom wall 63 and circumferential wall 64 of the battery case 61. Moreover, all of the open areas of the heat dissipation apertures 70 formed in the bottom wall 63 are equal to each other (see FIG. 3).

Figure 9:
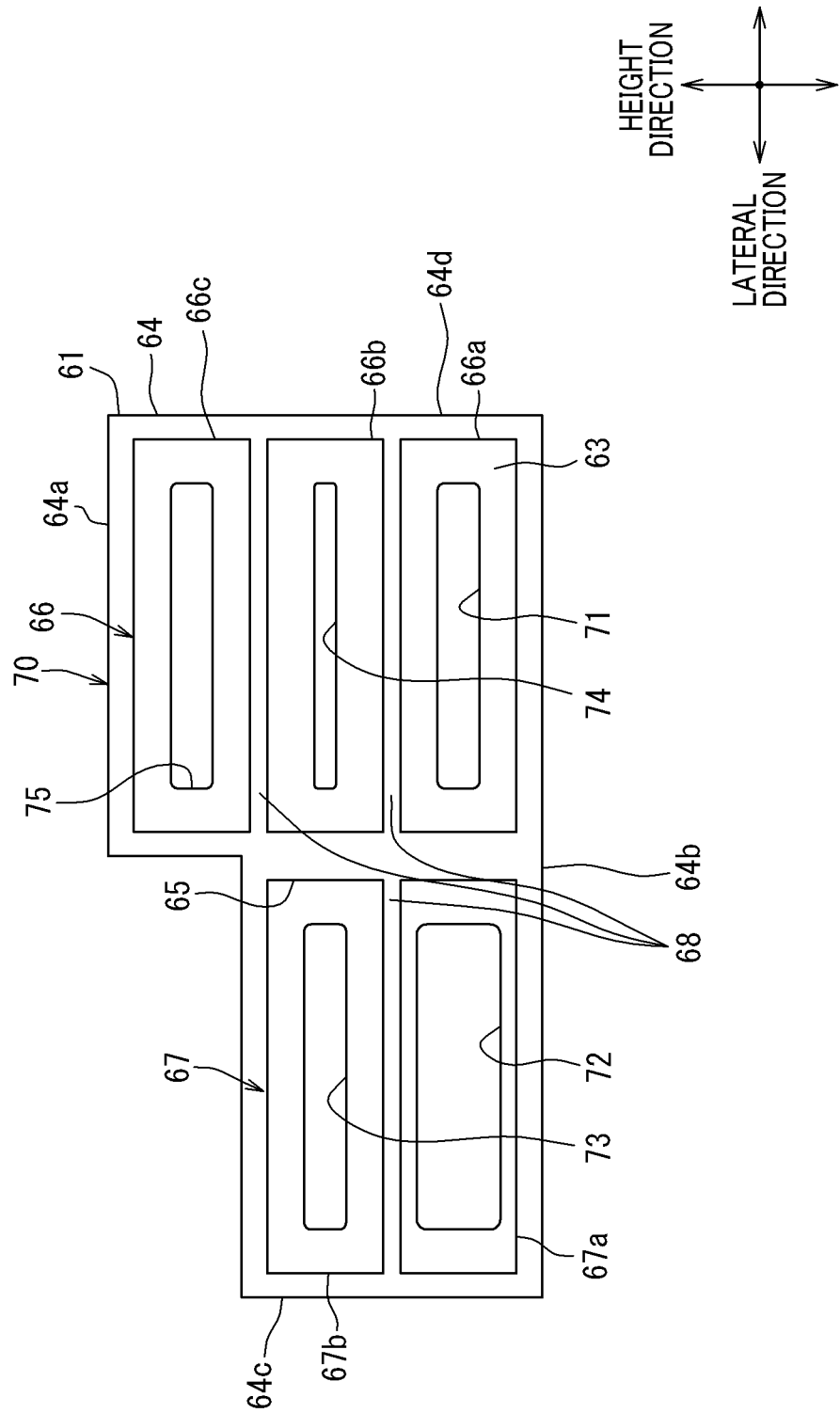
FIG. 9 is a front view of a battery case of a battery pack according to a third embodiment.

In comparison, in the present embodiment, as shown in FIG. 9, the heat dissipation apertures 70 are formed only in the bottom wall 73 of the battery case 61. That is, there are no heat dissipation apertures 70 formed in the circumferential wall 64 of the battery case 61.

More specifically, in the present embodiment, the heat dissipation apertures 70, which are formed in the bottom wall 73 of the battery case 61, include a first heat dissipation aperture 71, a second heat dissipation aperture 72, a third heat dissipation aperture 73, a fourth heat dissipation aperture 74 and a fifth heat dissipation aperture 75. The first to the fifth battery cells 11-15 are exposed to the outside of the battery case 61 respectively via the first to the fifth heat dissipation apertures 71-75.

Moreover, in the present embodiment, the open area of the first heat dissipation aperture 71, the open area of the third heat dissipation aperture 73 and the open area of the fifth heat dissipation aperture 75 are equal to each other. On the other hand, the open area of the second heat dissipation aperture 72 is larger than each of the open areas of the first, third and fifth heat dissipation apertures 71, 73 and 75. In contrast, the open area of the fourth heat dissipation aperture 74 is considerably smaller than each of the open areas of the first, third and fifth heat dissipation apertures 71, 73 and 75.

Consequently, in the present embodiment, the exposed area of the first battery cell 11 to the outside of the battery case 61 via the first heat dissipation aperture 71, the exposed area of the third battery cell 13 to the outside of the battery case 61 via the third heat dissipation aperture 73 and the exposed area of the fifth battery cell 15 to the outside of the battery case 61 via the fifth heat dissipation aperture 75 are equal to each other. On the other hand, the exposed area of the second battery cell 12 to the outside of the battery case 61 via the second heat dissipation aperture 72 is considerably larger than each of the aforementioned exposed areas of the first battery cell 11, the third battery cell 13 and the fifth battery cell 15. In contrast, the exposed area of the fourth battery cell 14 to the outside of the battery case 61 via the fourth heat dissipation aperture 74 is considerably smaller than each of the aforementioned exposed areas of the first battery cell 11, the third battery cell 13 and the fifth battery cell 15.

According to the present embodiment, it is also possible to achieve the same operational effects as described in the first embodiment.

In addition, though not shown in the figures, in the battery case 61, there may be formed two additional heat dissipation apertures for respectively arranging the first and second temperature sensors 41 and 42 therein. In this case, the formation of the two additional heat dissipation apertures in the battery case 61 would not change the aforementioned relationship in size between the exposed areas of the first to the fifth battery cells 11-15.

Fourth Embodiment

As described previously, in the first embodiment, the heat dissipation apertures 70 are formed in both the bottom wall 63 and circumferential wall 64 of the battery case 61 (see FIG. 3).

Figure 10:
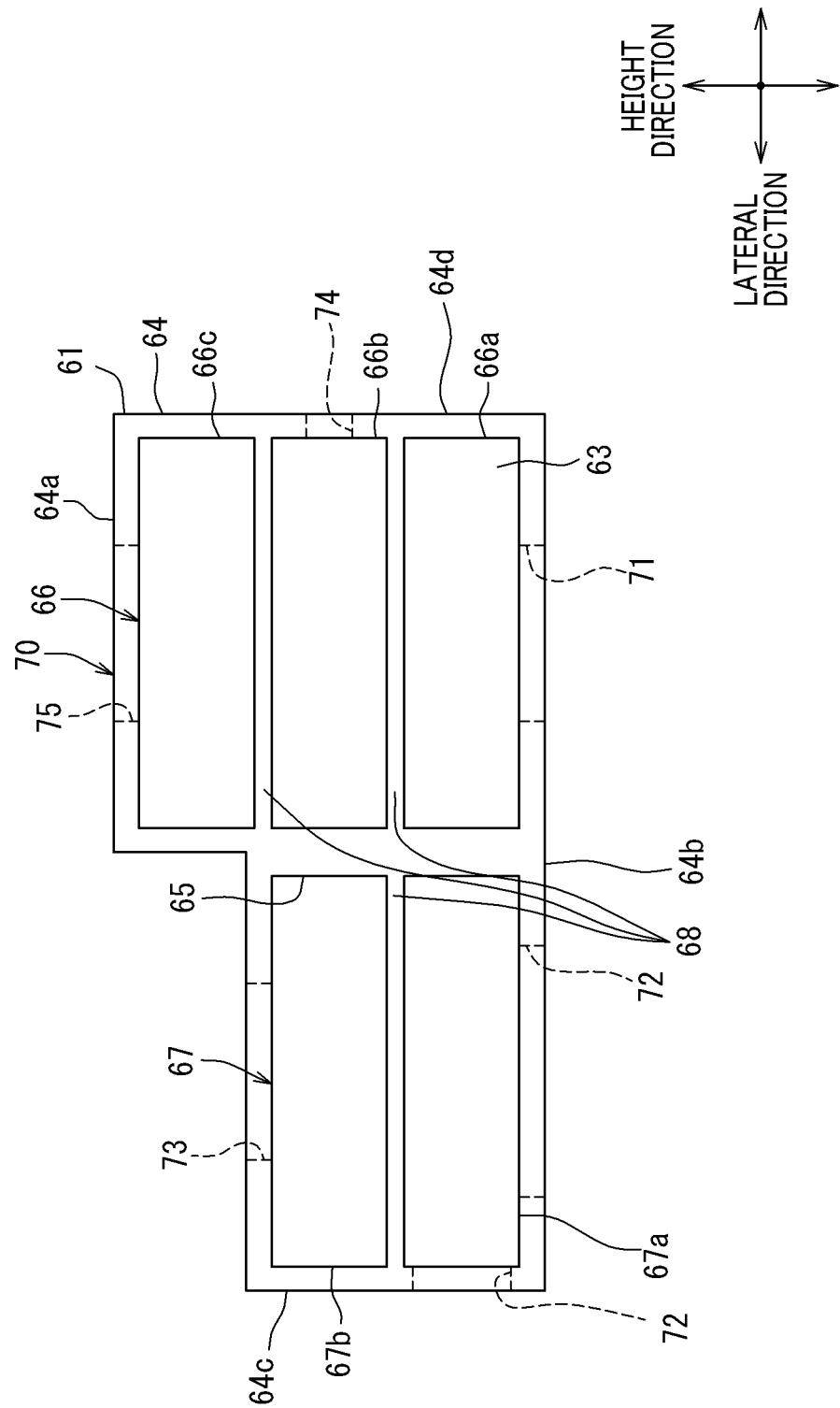
FIG. 10 is a front view of a battery case of a battery pack according to a fourth embodiment.

In comparison, in the present embodiment, as shown in FIG. 10, the heat dissipation apertures 70 formed in the bottom wall 63 of the battery case 61 are omitted. That is, the heat dissipation apertures 70 are formed only in the circumferential wall 64 of the battery case 61.

According to the present embodiment, it is also possible to achieve the same operational effects as described in the first embodiment.

Fifth Embodiment

In the first embodiment, the relationship in size between the second to the fifth connection busbars 82-85 is not particularly specified.

Figure 11:
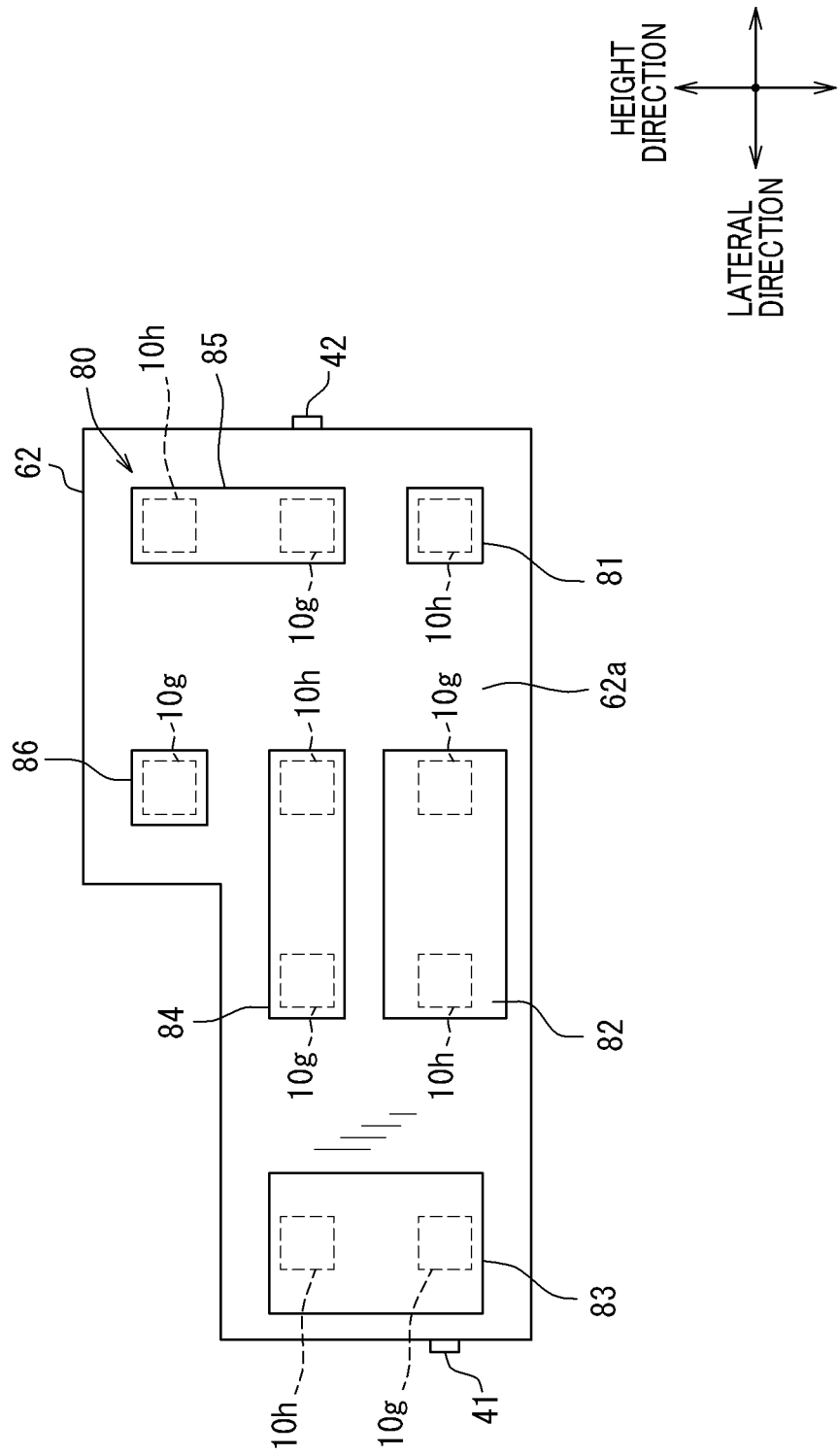
FIG. 11 is a front view illustrating connection busbars electrically connecting battery cells forming an assembled battery in a battery pack according to a fifth embodiment.

In comparison, in the present embodiment, as shown in FIG. 11, each of the sizes of the second and third connection busbars 82 and 83 is set to be larger than each of the sizes of the fourth and fifth connection busbars 84 and 85.

Both the second and third connection busbars 82 and 83 are connected with the second battery cell 12. Therefore, setting the sizes of the connection busbars 82 and 83 as above, it is possible to improve the heat dissipation performance of the second battery cell 12 through the connection busbars 82 and 83.

More particularly, in the present embodiment, each of the widths of the second and third connection busbars 82 and 83 is set to be larger than each of the widths of the fourth and fifth connection busbars 84 and 85. Here, for each of the connection busbars 82-85, the width of the connection busbar denotes the dimension of the connection busbar in a direction perpendicular to the direction in which the connection busbar extends to connect a corresponding pair of the positive and negative terminals 10g and 10h of the battery cells on the outer surface 62a of the wiring case 62.

According to the present embodiment, it is also possible to achieve the same operational effects as described in the first embodiment.

In addition, though not shown in the figures, the thicknesses of the second to the fifth connection busbars 82-85 may be suitably changed according to the required heat dissipation performances of the battery cells 11-15. Here, for each of the connection busbars 82-85, the thickness of the connection busbar denotes the dimension of the connection busbar in the longitudinal direction of the battery pack 100 (i.e., the direction perpendicular to the paper surface of FIG. 11).

Sixth Embodiment

As described previously, in the first embodiment, in the circumferential wall 64 of the battery case 61, there are formed the single first heat dissipation aperture 71, the single third heat dissipation aperture 73 and the single fifth heat dissipation aperture 75. Moreover, the open areas of the first, third and fifth heat dissipation apertures 71, 73 and 75 formed in the circumferential wall 64 of the battery case 61 are equal to each other (see FIG. 3).

Figure 12:
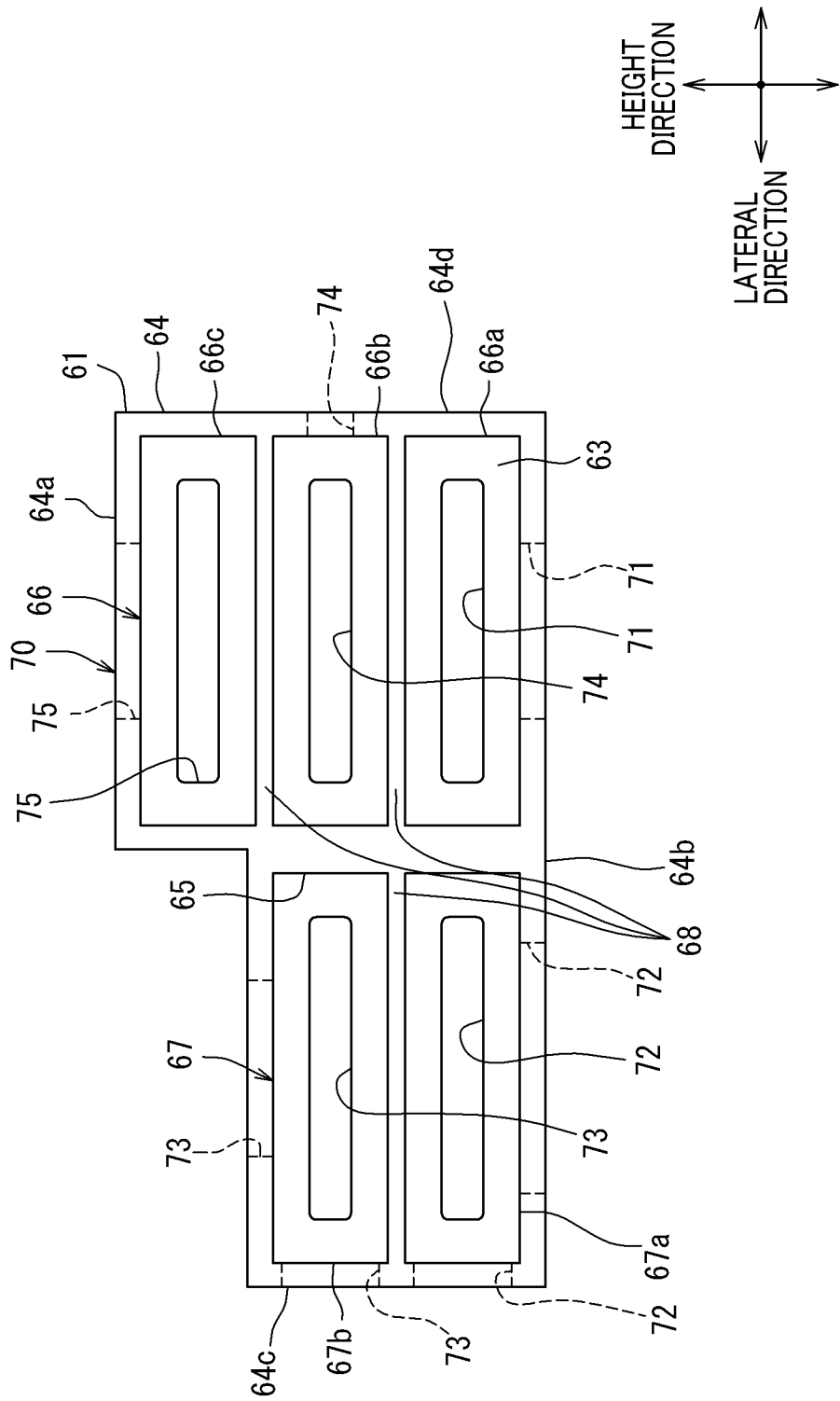
FIG. 12 is a front view of a battery case of a battery pack according to a sixth embodiment.

In comparison, in the present embodiment, as shown in FIG. 12, in the circumferential wall 64 of the battery case 61, there is further formed an additional third heat dissipation aperture 73. That is, in the present embodiment, there are formed two third heat dissipation apertures 73 in the circumferential wall 64 of the battery case 61. Specifically, one of the two third heat dissipation apertures 73 is formed in the left wall 64c while the other third heat dissipation aperture 73 is formed in the upper wall 64a as in the first embodiment.

Consequently, the exposed area of the third battery cell 13 to the outside of the battery case 61 via the third heat dissipation apertures 73 is increased, thereby improving the heat dissipation performance of the third battery cell 13. As a result, transmission of heat from the third battery cell 13 to the second battery cell 12 is suppressed, thus suppressing increase in the temperature of the second battery cell 12 due to heat transmitted from the third battery cell 13.

According to the present embodiment, it is also possible to achieve the same operational effects as described in the first embodiment.

Seventh Embodiment

As described previously, in the first embodiment, the first and second temperature sensors 41 and 42 are respectively arranged on the first side faces 10c of the second and fourth battery cells 12 and 14 (see FIGS. 2-4).

Figure 13:
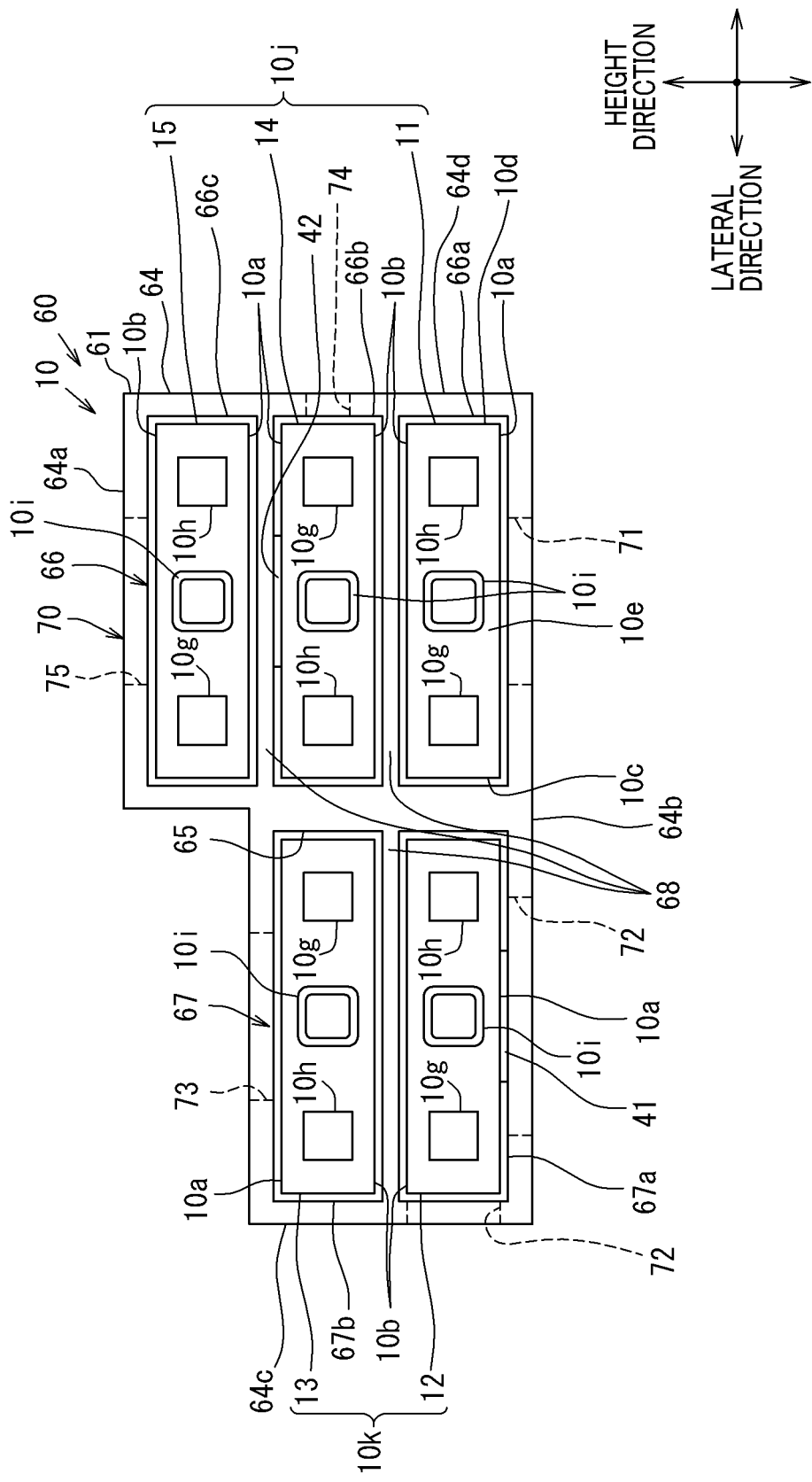
FIG. 13 is a front view illustrating the arrangement of temperature sensors in a battery pack according to a seventh embodiment.
Figure 14:
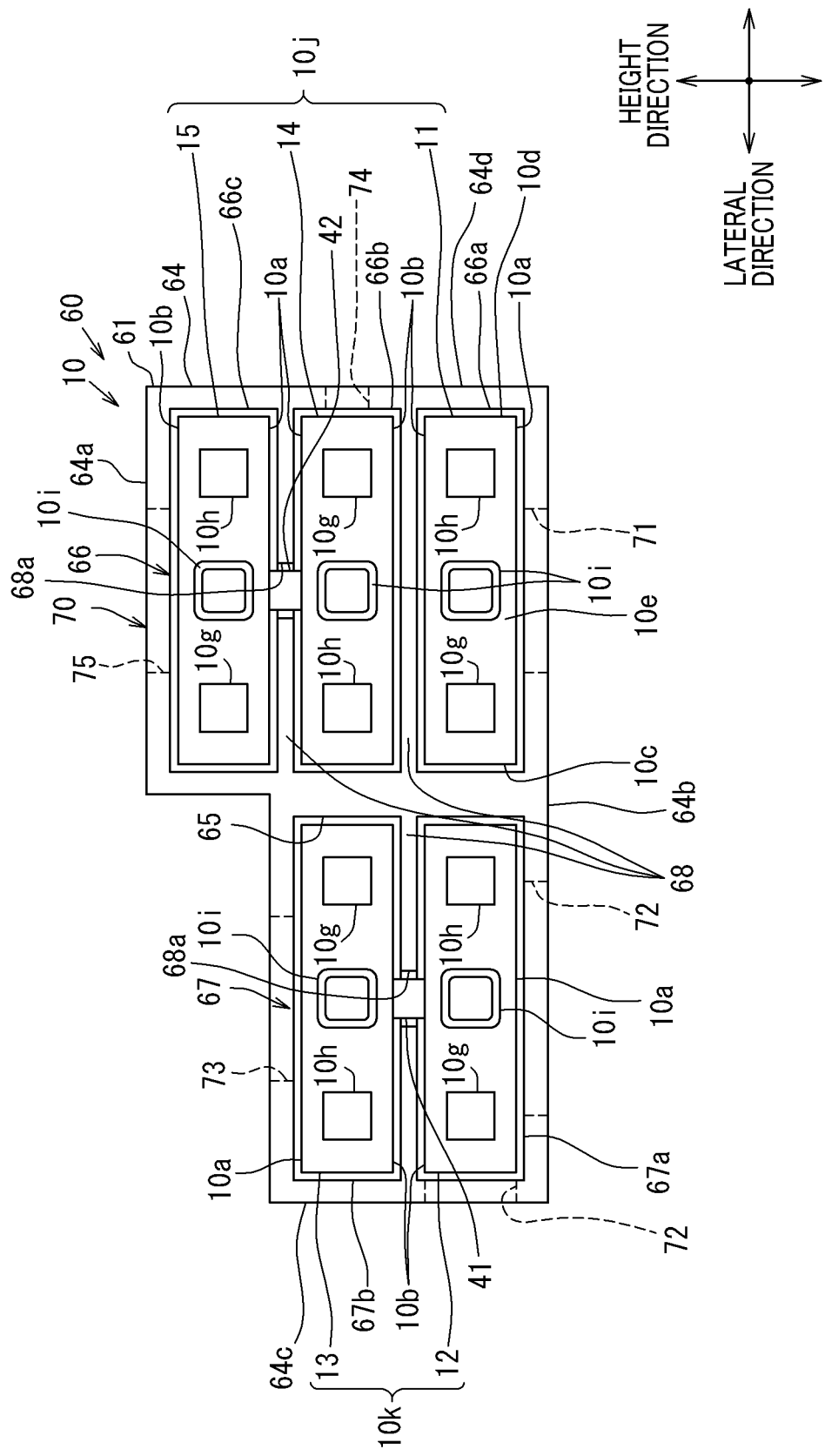
FIG. 14 is a front view illustrating the arrangement of temperature sensors in a battery pack according to an eighth embodiment.

In comparison, in the present embodiment, as shown in FIG. 13, the first temperature sensor 41 is arranged on the first major face 10a of the second battery cell 12. More specifically, the first temperature sensor 41 is arranged between the first major face 10a of the second battery cell 12 and that part of the lower wall 64b of the battery case 61 which defines the second battery cell-receiving space 67a. On the other hand, the second temperature sensor 42 is arranged on the first major face 10a of the fourth battery cell 14. More specifically, the second temperature sensor 42 is arranged between the first major face 10a of the fourth battery cell 14 and the second partition wall 68 that separates the fourth and fifth battery cell-receiving spaces 66b and 66c.

As described in the first embodiment, in the pack case 90, it is easy for temperature to increase in the height direction from the bottom wall 93 of the case main body 91 to the cover 92. Moreover, it is easier for temperature to change at the major faces of the battery cells than at the side faces of the same. Therefore, with the above arrangement of the first and second temperature sensors 41 and 42 according to the present embodiment, it is possible to more reliably and accurately detect both the highest temperature and lowest temperature in the assembled battery 10.

According to the present embodiment, it is also possible to achieve the same operational effects as described in the first embodiment.

In addition, though not shown in the figures, part of the first temperature sensor 41 may be arranged in the second heat dissipation aperture 72 formed in the lower wall 64b of the battery case 61.

Eighth Embodiment

As described previously, in the seventh embodiment, the first temperature sensor 41 is arranged between the first major face 10a of the second battery cell 12 and that part of the lower wall 64b of the battery case 61 which defines the second battery cell-receiving space 67a; the second temperature sensor 42 is arranged between the first major face 10a of the fourth battery cell 14 and the second partition wall 68 that separates the fourth and fifth battery cell-receiving spaces 66b and 66c (see FIG. 13).

In comparison, in the present embodiment, as shown in 14, the first temperature sensor 41 is arranged between the second and third battery cells 12 and 13. More specifically, in the second partition wall 68 that separates the second and third battery cell-receiving spaces 67a and 67b, there is formed a groove 68a in which the first temperature sensor 41 is arranged in contact with both the second and third battery cells 12 and 13. On the other hand, the second temperature sensor 42 is arranged between the fourth and fifth battery cells 14 and 15. More specifically, in the second partition wall 68 that separates the fourth and fifth battery cell-receiving spaces 66b and 66c, there is also formed a groove 68a in which the second temperature sensor 42 is arranged in contact with both the fourth and fifth battery cells 14 and 15.

According to the present embodiment, it is also possible to achieve the same operational effects as described in the first embodiment.

In addition, though not shown in the figures, the first temperature sensor 41 may alternatively be arranged on either of the end faces 10e and 10f of the second battery cell 12; the second temperature sensor 42 may alternatively be arranged on either of the end faces 10e and 10f of the fourth battery cell 14.

Ninth Embodiment

Figure 15:
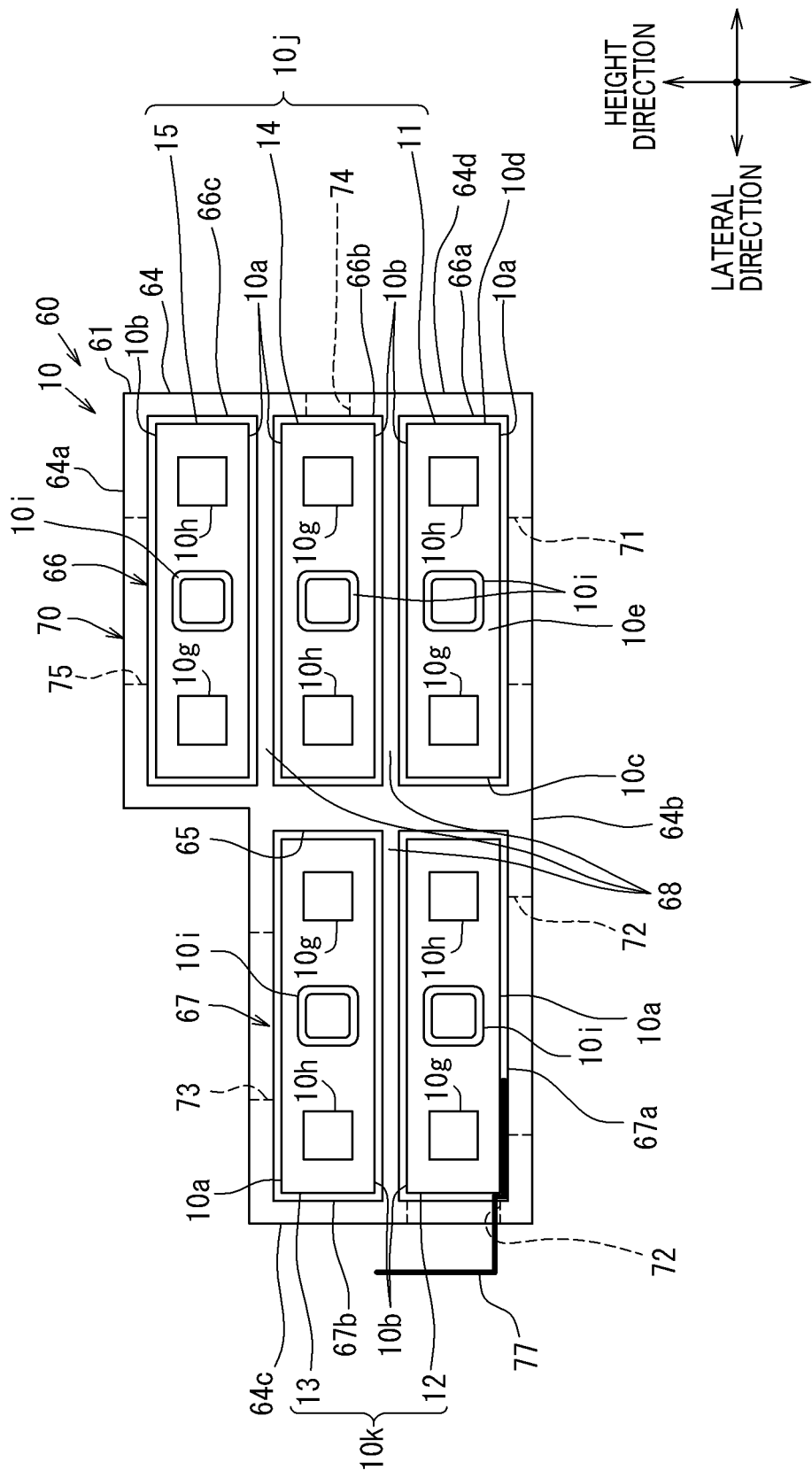
FIG. 15 is a front view illustrating the arrangement of a heat sink in a battery pack according to a ninth embodiment.

As shown in FIG. 15, in the present embodiment, a heat sink (or heat dissipating fin) 77 is both mechanically and thermally connected to the second battery cell 12. More specifically, the heat sink 77 has one end abutting the first major face 10a of the second battery cell 12 and the other end exposed to the outside of the battery case 61.

Consequently, with the heat sink 77, it is possible to further improve the heat dissipation performance of the second battery cell 12.

Tenth Embodiment

As described previously, in the first embodiment, the assembled battery 10 is formed of the five battery cells 11-15 (see FIG. 2).

Figure 16:
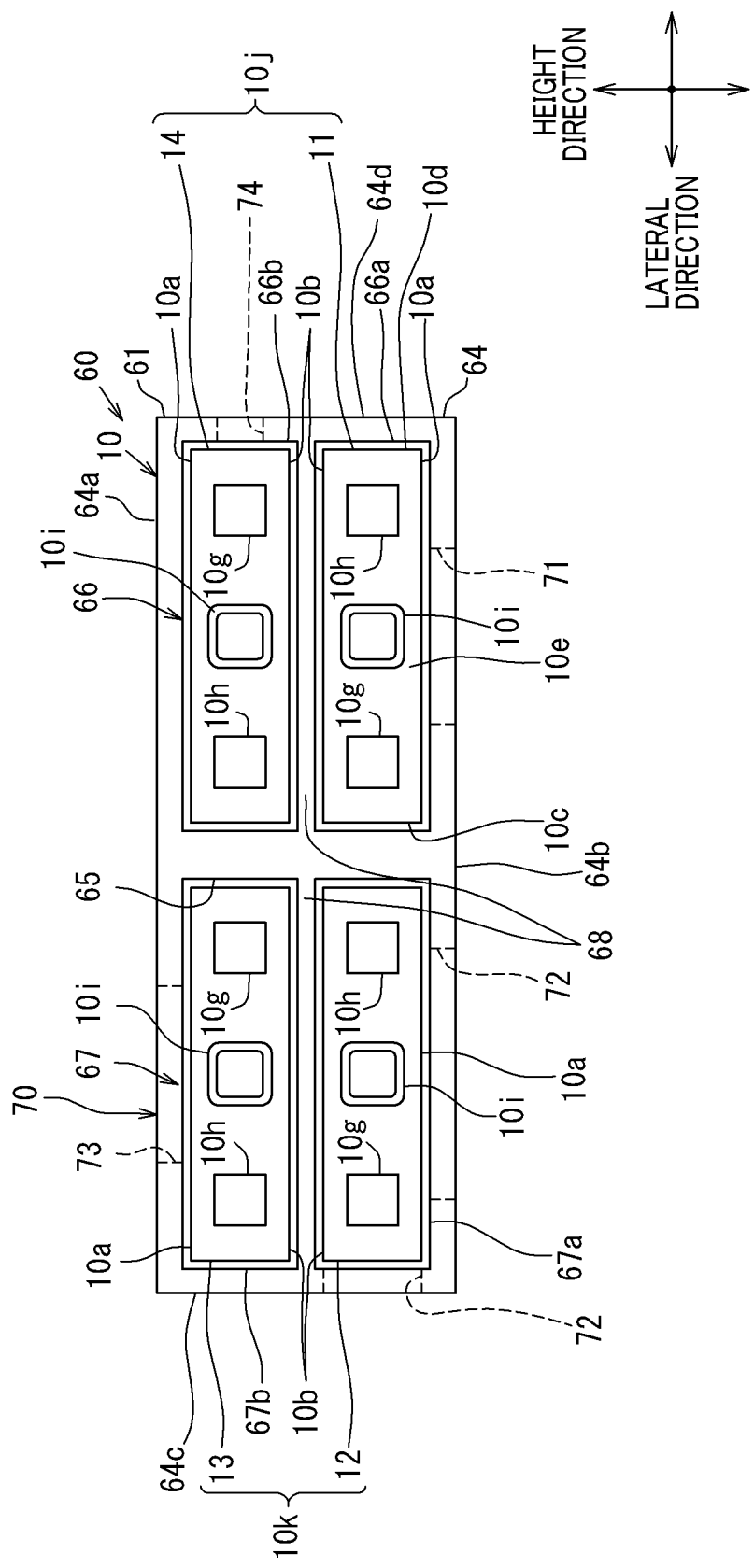
FIG. 16 is a front view illustrating the configuration of an assembled battery of a battery pack according to a tenth embodiment.

In comparison, in the present embodiment, as shown in FIG. 16, the fifth battery cell 15 is removed from the assembled battery 10. That is, in the present embodiment, the assembled battery 10 is formed of the four battery cells 11-14. Moreover, among the four battery cells 11-14, the second battery cell 12 has the maximum exposed area to the outside of the battery case 61 whereas the fourth battery cell 14 has the minimum exposed area to the outside of the battery case 61.

In addition, though not shown in the figures, the assembled battery 10 may alternatively be formed of three or sixth or more battery cells.

Eleventh Embodiment

As described previously, in the first embodiment, the battery cells 11-15 forming the assembled battery 10 are arranged to form the two battery stacks 10j and 10k (see FIG. 2).

However, the battery cells forming the assembled battery may alternatively be arranged to form a single or three or more battery stacks.

Figure 17:
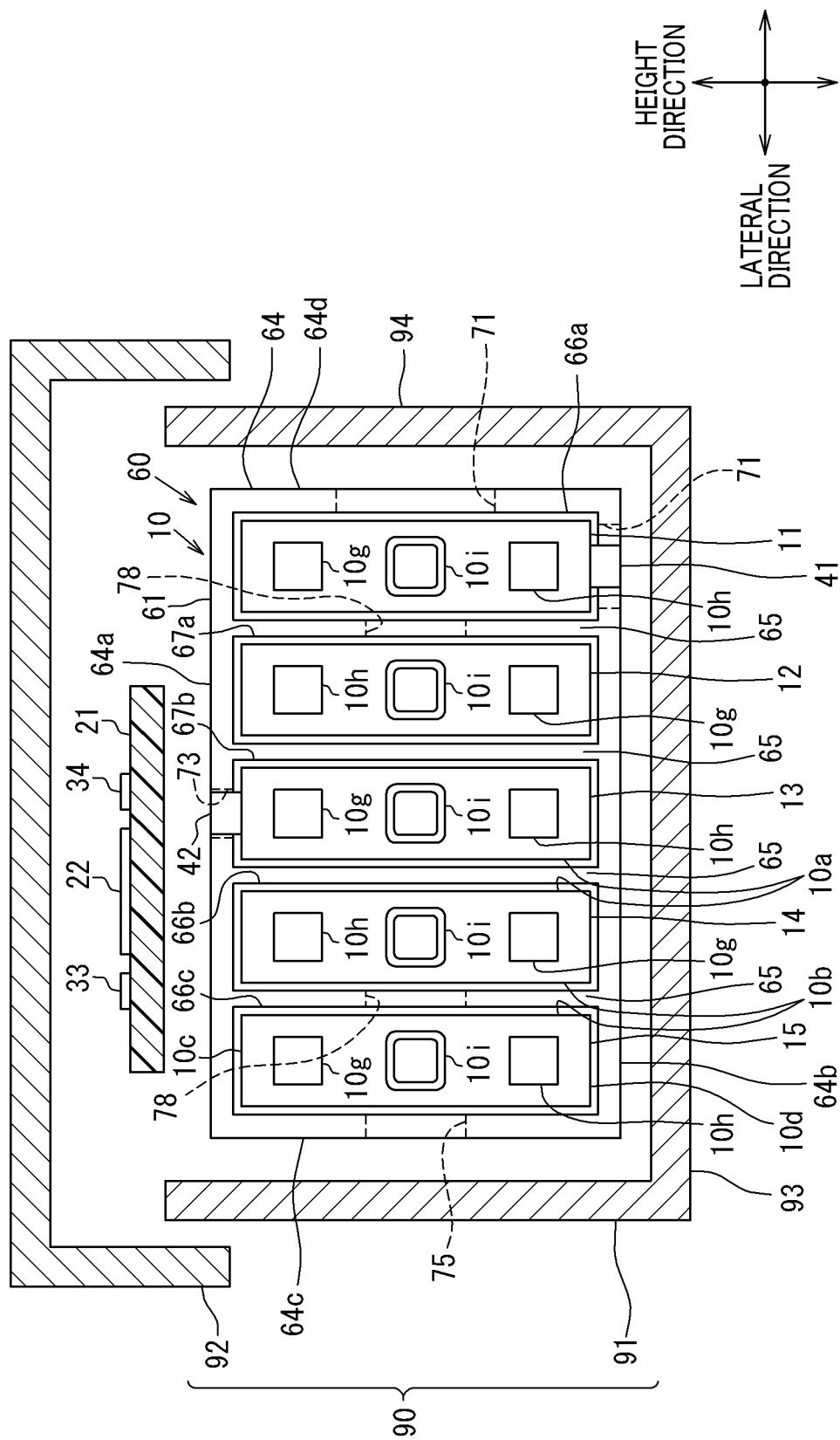
FIG. 17 is a cross-sectional view illustrating the configuration of an assembled battery of a battery pack according to an eleventh embodiment.
Figure 18:
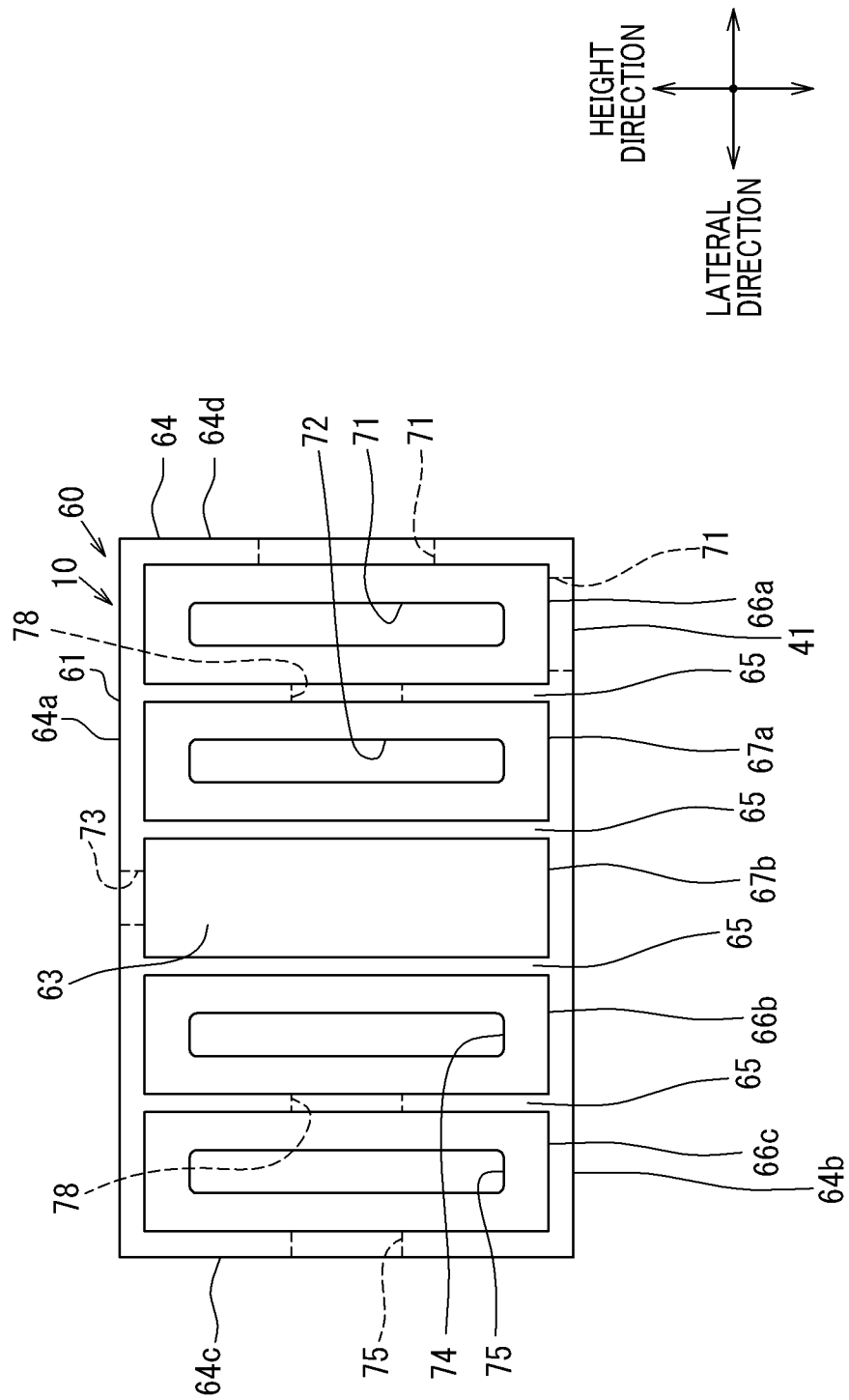
FIG. 18 is a front view of a battery case of the battery pack according to the eleventh embodiment.

For example, in the present embodiment, as shown in FIGS. 17 and 18, the first to the fifth battery cells 11-15 are arranged in the lateral direction to form a single battery stack. Moreover, the battery case 61 has first partition walls 65 extending in the height direction, but no second partition wall 68 extending in the lateral direction.

Specifically, in the present embodiment, the battery case 61 has four first partition walls 65 each of which extends in the height direction to connect the upper wall 64a and bottom wall 64b of the battery case 61. Moreover, the four first partition walls 65 are spaced at equal intervals in the lateral direction to partition the internal space of the battery case 61 surrounded by the circumferential wall 64 into five equal parts in the lateral direction. The five equal parts respectively constitute a first battery cell-receiving space 66a, a second battery cell-receiving space 67a, a third battery cell-receiving space 67b, a fourth battery cell-receiving space 66b and a fifth battery cell-receiving space 66c that are arranged in this order in the lateral direction from the right wall 64d to the left wall 64c of the battery case 61. The first to the fifth battery cells 11-15 are respectively received in the first to the fifth battery cell-receiving spaces 66a, 67a-67b and 66b-66c.

Moreover, as shown in FIG. 18, in the first partition wall 65 that separates the first and second battery cell-receiving spaces 66a and 67a, there is formed a communication hole 78 via which the first and second battery cell-receiving spaces 66a and 67a communicate with each other. Moreover, in the first partition wall 65 that separates the fourth and fifth battery cell-receiving spaces 66b and 66c, there is also formed a communication hole 78 via which the fourth and fifth battery cell-receiving spaces 66b and 66c communicate with each other. On the other hand, neither of the first partition wall 65 that separates the second and third battery cell-receiving spaces 67a and 67b and the first partition wall 65 that separates the third and fourth battery cell-receiving spaces 67b and 66b has a communication hole 78 formed therein.

In the present embodiment, there are heat dissipation apertures 70 formed in the bottom wall 63 and circumferential wall 64 of the battery case 61.

Specifically, the heat dissipation apertures 70 formed in the bottom wall 63 of the battery case 61 include a first heat dissipation aperture 71, a second heat dissipation aperture 72, a fourth heat dissipation aperture 74 and a fifth heat dissipation aperture 75. The first heat dissipation aperture 71 is formed in that part of the bottom wall 63 which defines the first battery cell-receiving space 66a. The second heat dissipation aperture 72 is formed in that part of the bottom wall 63 which defines the second battery cell-receiving space 67a. The fourth heat dissipation aperture 74 is formed in that part of the bottom wall 63 which defines the fourth battery cell-receiving space 66b. The fifth heat dissipation aperture 75 is formed in that part of the bottom wall 63 which defines the fifth battery cell-receiving space 66c. Moreover, all of the open areas of the heat dissipation apertures 71-72 and 74-75 formed in the bottom wall 63 are equal to each other.

On the other hand, the heat dissipation apertures 70 formed in the circumferential wall 64 of the battery case 61 include two first heat dissipation apertures 71, a third heat dissipation aperture 73 and a fifth heat dissipation aperture 75. One of the two first heat dissipation apertures 71 is formed in the right wall 64d while the other first heat dissipation aperture 71 is formed in that part of the lower wall 64b which defines the first battery cell-receiving space 66a. The third heat dissipation aperture 73 is formed in that part of the upper wall 64a which defines the third battery cell-receiving space 67b. The fifth heat dissipation aperture 75 is formed in the left wall 64c. Moreover, the open area of the first heat dissipation aperture 71 formed in the right wall 64*d* is considerably larger than each of the open areas of the first heat dissipation aperture 71 formed in the lower wall 64*b* and the fifth heat dissipation aperture 75. In contrast, the open area of the third heat dissipation aperture 73 is considerably smaller than each of the open areas of the first heat dissipation aperture 71 formed in the lower wall 64*b* and the fifth heat dissipation aperture 75.

With the above formation of the heat dissipation apertures 71-75 in the battery case 61, there is variation in the exposed areas of the battery cells 11-15 to the outside of the battery case 61 respectively via the heat dissipation apertures 71-75.

More specifically, in the present embodiment, the exposed areas of the battery cells 11-15 to the outside of the battery case 61 decrease in the order of the first battery cell 11, the fifth battery cell 15, the second and fourth battery cells 12 and 14, and the third battery cell 13.

Moreover, in the present embodiment, the first battery cell 11 is arranged at one end of the single battery stack (or battery-cell array) formed of the five battery cells 11-15 while the third battery cell 13 is arranged inside (or away from both ends of) of the single battery stack. In addition, neither of the first partition walls 65 defining the third battery cell-receiving space 67*b* has a communication hole 78 formed therein.

With the above configuration of the battery pack 100 according to the present embodiment, it is easier for the heat generated in the first battery cell 11 to be dissipated than for the heat generated in the other battery cells 12-15 to be dissipated. Therefore, it is more difficult for the temperature of the first battery cell 11 to increase than for the temperatures of the other battery cells 12-15 to increase. In contrast, it is more difficult for the heat generated in the third battery cell 13 to be dissipated than for the heat generated in the other battery cells 11-12 and 14-15 to be dissipated. Therefore, it is easier for the temperature of the third battery cell 13 to increase than for the temperatures of the other battery cells 11-12 and 14-15 to increase.

In view of the above, in the present embodiment, though not shown in the figures, the first temperature sensor 41 is arranged to detect the temperature of the first battery cell 11 while the second temperature sensor 42 is arranged to detect the temperature of the third battery cell 13.

According to the present embodiment, it is also possible to achieve the same operational effects as described in the first embodiment.

Twelfth Embodiment

Figure 19:
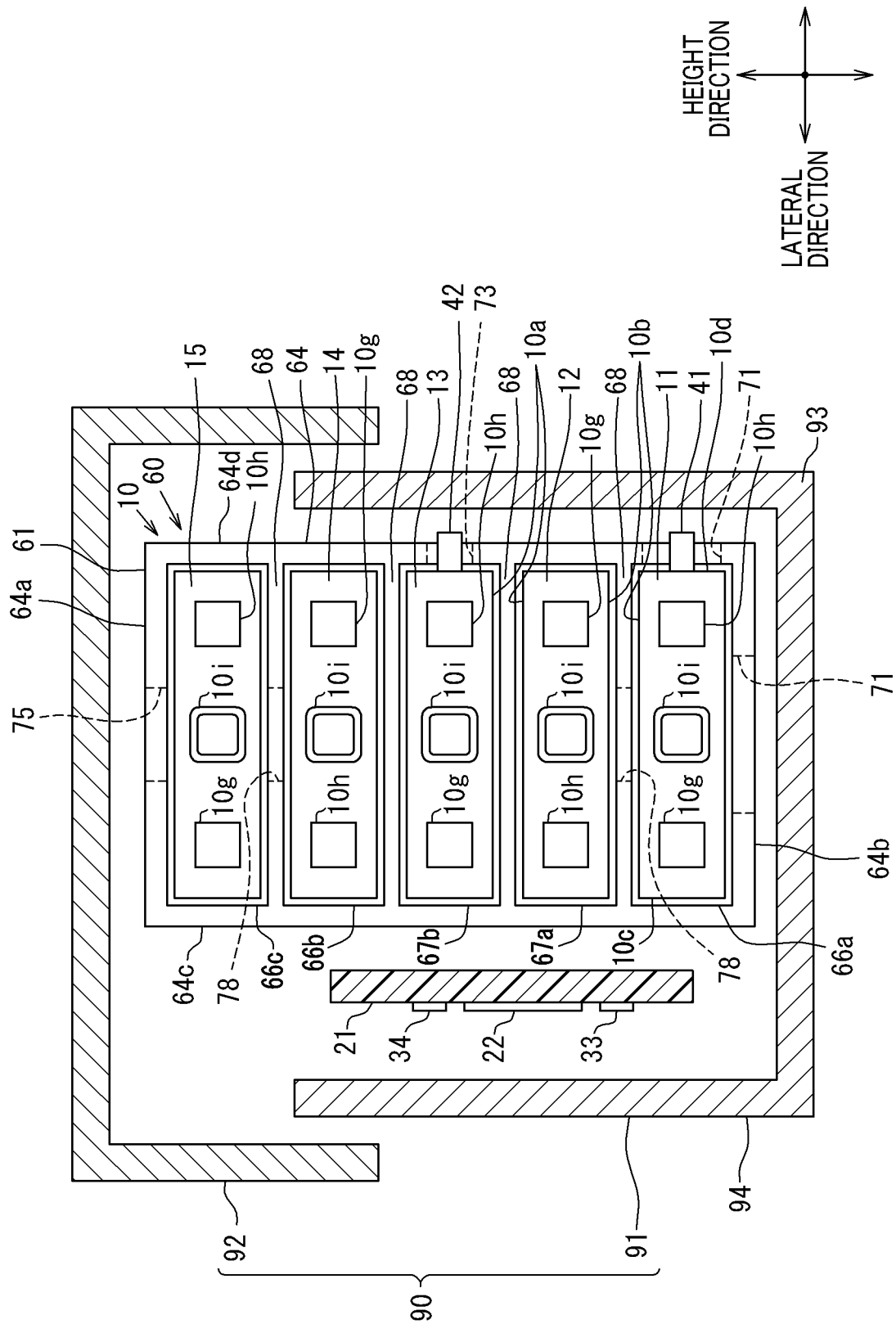
FIG. 19 is a cross-sectional view illustrating the configuration of an assembled battery of a battery pack according to a twelfth embodiment.

In this embodiment, as shown in FIGS. 19 and 20, the first to the fifth battery cells 11-15 are arranged in the height direction to form a single battery stack. Moreover, the battery case 61 has second partition walls 68 extending in the lateral direction, but no first partition wall 65 extending in the height direction.

Specifically, in the present embodiment, the battery case 61 has four second partition walls 68 each of which extends in the lateral direction to connect the left wall 64*c* and right wall 64*d* of the battery case 61. Moreover, the four second partition walls 68 are spaced at equal intervals in the height direction to partition the internal space of the battery case 61 surrounded by the circumferential wall 64 into five equal parts in the height direction. The five equal parts respectively constitute a first battery cell-receiving space 66*a*, a second battery cell-receiving space 67*a*, a third battery cell-receiving space 67*b*, a fourth battery cell-receiving space 66*b* and a fifth battery cell-receiving space 66*c* that are arranged in this order in the height direction from the lower wall 64*b* to the upper wall 64*a* of the battery case 61. The first to the fifth battery cells 11-15 are respectively received in the first to the fifth battery cell-receiving spaces 66*a*, 67*a*-67*b* and 66*b*-66*c*.

Moreover, as shown in FIG. 20, in the second partition wall 68 that separates the first and second battery cell-receiving spaces 66*a* and 67*a*, there is formed a communication hole 78 via which the first and second battery cell-receiving spaces 66*a* and 67*a* communicate with each other. Moreover, in the second partition wall 68 that separates the fourth and fifth battery cell-receiving spaces 66*b* and 66*c*, there is also formed a communication hole 78 via which the fourth and fifth battery cell-receiving spaces 66*b* and 66*c* communicate with each other. On the other hand, neither of the second partition wall 68 that separates the second and third battery cell-receiving spaces 67*a* and 67*b* and the second partition wall 68 that separates the third and fourth battery cell-receiving spaces 67*b* and 66*b* has a communication hole 78 formed therein.

In the present embodiment, there are heat dissipation apertures 70 formed in the bottom wall 63 and circumferential wall 64 of the battery case 61.

Specifically, the heat dissipation apertures 70 formed in the bottom wall 63 of the battery case 61 include a first heat dissipation aperture 71, a second heat dissipation aperture 72, a fourth heat dissipation aperture 74 and a fifth heat dissipation aperture 75. The first heat dissipation aperture 71 is formed in that part of the bottom wall 63 which defines the first battery cell-receiving space 66*a*. The second heat dissipation aperture 72 is formed in that part of the bottom wall 63 which defines the second battery cell-receiving space 67*a*. The fourth heat dissipation aperture 74 is formed in that part of the bottom wall 63 which defines the fourth battery cell-receiving space 66*b*. The fifth heat dissipation aperture 75 is formed in that part of the bottom wall 63 which defines the fifth battery cell-receiving space 66*c*. Moreover, all of the open areas of the heat dissipation apertures 71-72 and 74-75 formed in the bottom wall 63 are equal to each other.

On the other hand, the heat dissipation apertures 70 formed in the circumferential wall 64 of the battery case 61 include two first heat dissipation apertures 71, a third heat dissipation aperture 73 and a fifth heat dissipation aperture 75. One of the two first heat dissipation apertures 71 is formed in the lower wall 64*b* while the other first heat dissipation aperture 71 is formed in that part of the right wall 64*d* which defines the first battery cell-receiving space 66*a*. The third heat dissipation aperture 73 is formed in that part of the right wall 64*d* which defines the third battery cell-receiving space 67*b*. The fifth heat dissipation aperture 75 is formed in the upper wall 64*a*. Moreover, the open area of the first heat dissipation aperture 71 formed in the lower wall 64*b* is considerably larger than each of the open areas of the first heat dissipation aperture 71 formed in the right wall 64*d* and the fifth heat dissipation aperture 75. In contrast, the open area of the third heat dissipation aperture 73 is considerably smaller than each of the open areas of the first heat dissipation aperture 71 formed in the right wall 64*d* and the fifth heat dissipation aperture 75.

With the above formation of the heat dissipation apertures 71-75 in the battery case 61, there is variation in the exposed areas of the battery cells 11-15 to the outside of the battery case 61 respectively via the heat dissipation apertures 71-75.

More specifically, in the present embodiment, the exposed areas of the battery cells 11-15 to the outside of the battery case 61 decrease in the order of the first battery cell 11, the fifth battery cell 15, the second and fourth battery cells 12 and 14, and the third battery cell 13.

Moreover, in the present embodiment, the first battery cell 11 is arranged at one end of the single battery stack (or battery-cell array) formed of the five battery cells 11-15 while the third battery cell 13 is arranged inside (or away from both ends of) of the single battery stack. Among the battery cells 11-15, the first battery cell 11 is located closest to the bottom wall 93 of the case main body 91 of the pack case 90. That is, the third battery cell 13 is located closer than the first battery cell 11 to the cover 92 of the pack case 90. In addition, neither of the second partition walls 68 defining the third battery cell-receiving space 67b has a communication hole 78 formed therein.

With the above configuration of the battery pack 100 according to the present embodiment, it is easier for the heat generated in the first battery cell 11 to be dissipated than for the heat generated in the other battery cells 12-15 to be dissipated. Therefore, it is more difficult for the temperature of the first battery cell 11 to increase than for the temperatures of the other battery cells 12-15 to increase. In contrast, it is more difficult for the heat generated in the third battery cell 13 to be dissipated than for the heat generated in the other battery cells 11-12 and 14-15 to be dissipated. Therefore, it is easier for the temperature of the third battery cell 13 to increase than for the temperatures of the other battery cells 11-12 and 14-15 to increase.

In view of the above, in the present embodiment, though not shown in the figures, the first temperature sensor 41 is arranged to detect the temperature of the first battery cell 11 while the second temperature sensor 42 is arranged to detect the temperature of the third battery cell 13.

In addition, the exposed areas of the battery cells 11-15 to the outside of the battery case 61 may be suitably changed by changing the open areas of the heat dissipation apertures 71-75. For example, the exposed areas of the battery cells 11-15 to the outside of the battery case 61 may be changed so that among the battery cells 11-15, the fifth battery cell 15 has the maximum exposed area whereas the second battery cell 12 or the fourth battery cell 14 has the minimum exposed area.

While the above particular embodiments have been shown and described, it will be understood by those skilled in the art that various modifications, changes, and improvements may be made without departing from the spirit of the present disclosure.

For example, in the above-described embodiments, the heat dissipation apertures 70 are formed in the battery case 61. Alternatively, the heat dissipation apertures 70 may be formed in the wiring case 62. As another alternative, the heat dissipation apertures 70 may be formed in both the battery case 61 and the wiring case 62. That is to say, the heat dissipation apertures 70 may be suitably formed in the module case 60. In these cases, the entire module case 60 may be regarded as a battery case for receiving the assembled battery 10.

Moreover, in the above-described embodiments, the battery pack 100 is employed in the power supply system 200 of the vehicle that has the idle stop function. Alternatively, the battery pack 100 may be employed in a power supply system of a hybrid or electric vehicle.

What is claimed is:
1. A battery pack comprising:
an assembled battery having three or more battery cells electrically connected in series with each other;
a battery case having the assembled battery received therein so that the assembled battery is partially exposed to outside of the battery case;
a first temperature sensor provided to detect temperature of a most-exposed one of the three or more battery cells, the most-exposed battery cell having a maximum exposed area to the outside of the battery case among all of the three or more battery cells;
a second temperature sensor provided to detect temperature of a least-exposed one of the three or more battery cells, the least-exposed battery cell having a minimum exposed area to the outside of the battery case among all of the three or more battery cells; and
a battery monitoring circuit configured to estimate, based on both the temperature of the most-exposed battery cell detected by the first temperature sensor and the temperature of the least-exposed battery cell detected by the second temperature sensor, a temperature of each of the three or more battery cells other than the most-exposed battery cell and the least-exposed battery cell.

2. The battery pack as set forth in claim 1, further comprising a controller configured to control charge and discharge of the assembled battery based on the temperatures of the most-exposed and least-exposed battery cells detected by the first and second temperature sensors,
wherein
each of the three or more battery cells is a secondary battery that generates electromotive force by chemical reactions, and
the controller is configured to:
restrict discharge of the assembled battery when the temperature of the most-exposed battery cell detected by the first temperature sensor is lower than a predetermined low-temperature threshold; and
restrict both charge and discharge of the assembled battery when the temperature of the least-exposed battery cell detected by the second temperature sensor is higher than a predetermined high-temperature threshold, the high-temperature threshold being higher than the low-temperature threshold.

3. The battery pack as set forth in claim 1, wherein in the battery case, there are formed heat dissipation apertures via which the assembled battery is partially exposed to the outside of the battery case.

4. The battery pack as set forth in claim 3, wherein the heat dissipation apertures comprise:
a largest heat dissipation aperture which has a maximum open area among all of the heat dissipation apertures and via which part of the most-exposed battery cell is exposed to the outside of the battery case; and
a smallest heat dissipation aperture which has a minimum open area among all of the heat dissipation apertures and via which part of the least-exposed battery cell is exposed to the outside of the battery case.

5. The battery pack as set forth in claim 1, wherein the three or more battery cells are arranged to form at least one battery-cell array,
the most-exposed battery cell is arranged at one end of the at least one battery-cell array, and
the least-exposed battery cell is arranged inside the at least one battery-cell array.

6. The battery pack as set forth in claim 1, wherein the three or more battery cells are arranged to form, at least, a first battery-cell array and a second battery-cell array,
the most-exposed battery cell is included in the first battery-cell array and the least-exposed battery cell is included in the second battery-cell array, and the number of the battery cells included in the first battery-cell array is smaller than the number of the battery cells included in the second battery-cell array.

7. The battery pack as set forth in claim 1, further comprising a pack case in which all of the assembled battery, the battery case and the first and second temperature sensors are received, wherein the pack case includes a case main body that has a bottom wall and a ring-shaped side wall extending from the bottom wall, and the most-exposed battery cell is located closer than the least-exposed battery cell to the bottom wall of the case main body.

8. The battery pack as set forth in claim 1, further comprising a heat sink provided to dissipate heat generated in the assembled battery, wherein the heat sink is thermally connected with the most-exposed battery cell.

9. The battery pack as set forth in claim 1, wherein the battery pack comprises, as temperature sensors for detecting the temperatures of the three or more battery cells, only the first and second temperature sensors.

\* \* \* \* \*